US006247102B1

(12) United States Patent
Chin et al.

(10) Patent No.: US 6,247,102 B1
(45) Date of Patent: Jun. 12, 2001

(54) COMPUTER SYSTEM EMPLOYING MEMORY CONTROLLER AND BRIDGE INTERFACE PERMITTING CONCURRENT OPERATION

(75) Inventors: Kenneth T. Chin, Cypress; Jerome J. Johnson; Phillip M. Jones, both of Spring; Robert A. Lester, Houston; Gary J. Piccirillo, Cypress; Jeffrey C. Stevens, Spring, all of TX (US); C. Kevin Coffee, Pembroke, FL (US); Michael J. Collins, Tomball; John Larson, Houston, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/047,876

(22) Filed: Mar. 25, 1998

(51) Int. Cl.[7] .................................................. G06F 13/14

(52) U.S. Cl. ........................................ 711/150; 711/126

(58) Field of Search .................................. 711/118, 150; 710/52, 126

(56) References Cited

U.S. PATENT DOCUMENTS

| 5,634,073 | 5/1997 | Collins et al. ......................... 395/825 |
| 5,937,173 | * 8/1999 | Olarig et al. .......................... 395/306 |
| 5,950,229 | * 9/1999 | Jeddeloh .............................. 711/150 |

OTHER PUBLICATIONS

Intel 440LX AGPSET: 82443LX PCI A.G.P. Controller (PAC), Jan. 1998.

Intel® 44BX AGPset: 82443BX Host Bridge/Controller, Apr. 1998.

* cited by examiner

Primary Examiner—Kevin L. Ellis
(74) Attorney, Agent, or Firm—Conley, Rose & Tayon, P.C.; Michael F. Heim

(57) ABSTRACT

A computer system includes a CPU, a memory device, two expansion buses, and a bridge logic unit coupling together the CPU, the memory device and the expansion buses. The CPU couples to the bridge logic unit via a CPU bus and the memory device couples to the bridge logic unit via a memory bus. The bridge logic unit generally routes bus cycle requests from one of the four buses to another of the buses while concurrently routing bus cycle requests to another pair of buses. The bridge logic unit preferably includes four interfaces, one each to the CPU, memory device and the two expansion buses. Each pair of interfaces are coupled by at least one queue; write requests are stored (or "posted") in write queues and read data are stored in read queues. Because each interface can communicate concurrently with all other interfaces via the read and write queues, the possibility exists that a first interface cannot access a second interface because the second interface is busy processing read or write requests from a third interface, thus starving the first interface for access to the second interface. To remedy this starvation problem, the bridge logic unit prevents the third interface from posting additional write requests to its write queue, thereby permitting the first interface access to the second interface. Further, read cycles may be retried from one interface to allow another interface to complete its bus transactions.

41 Claims, 12 Drawing Sheets

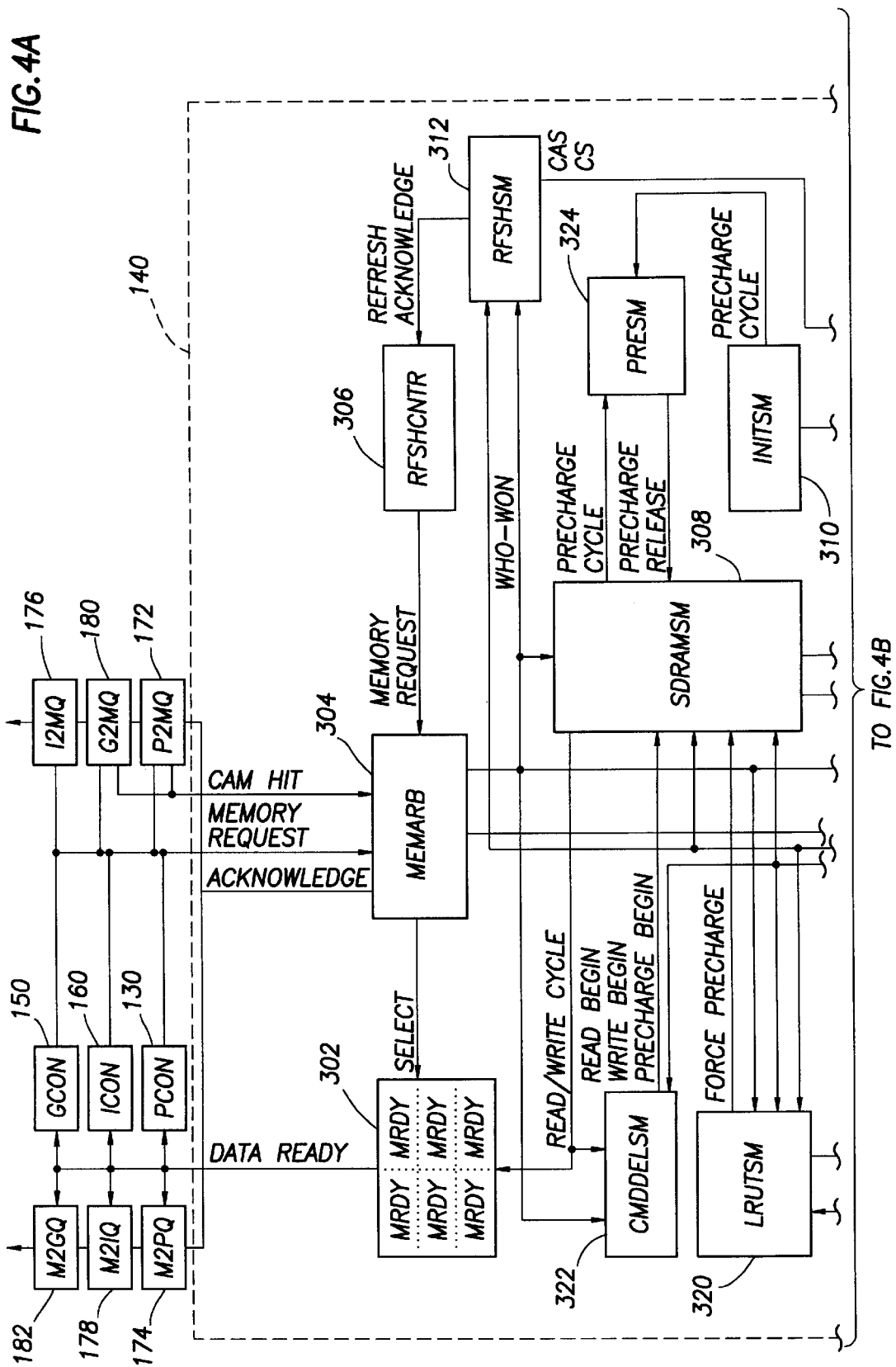

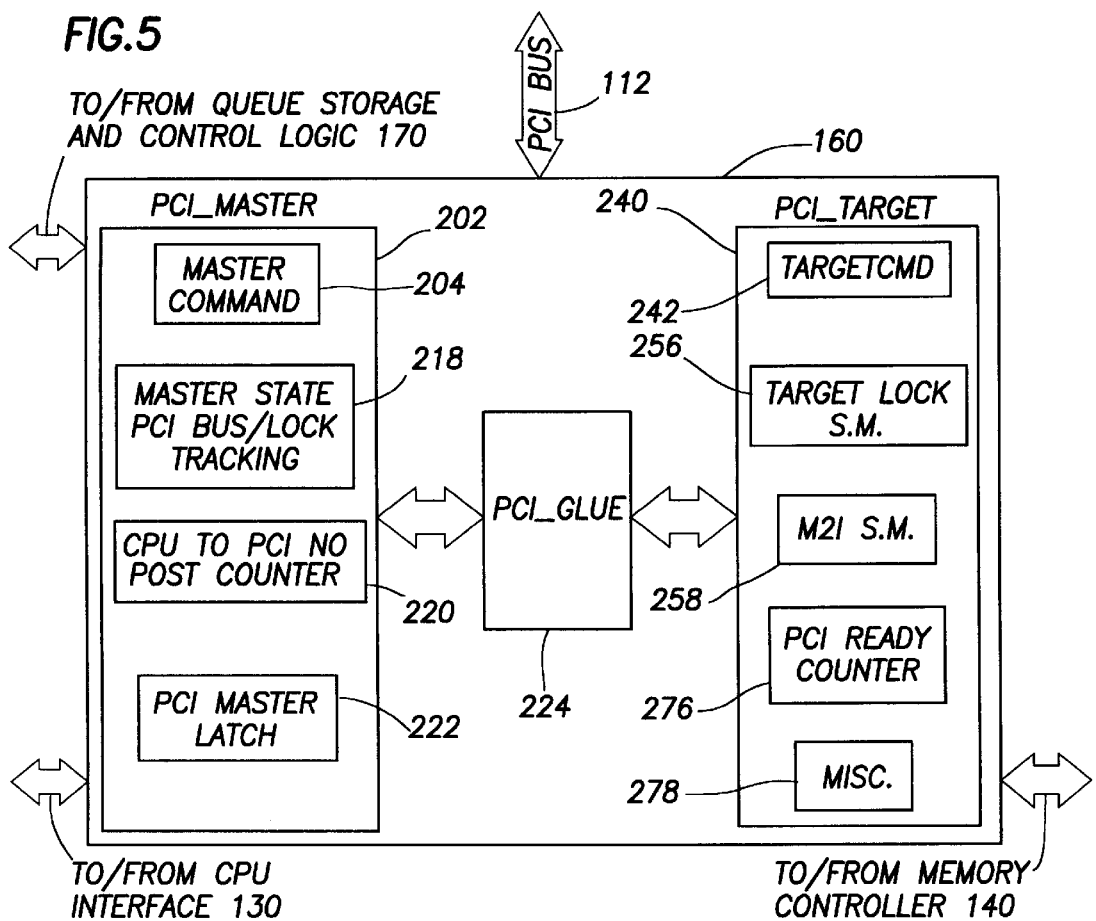
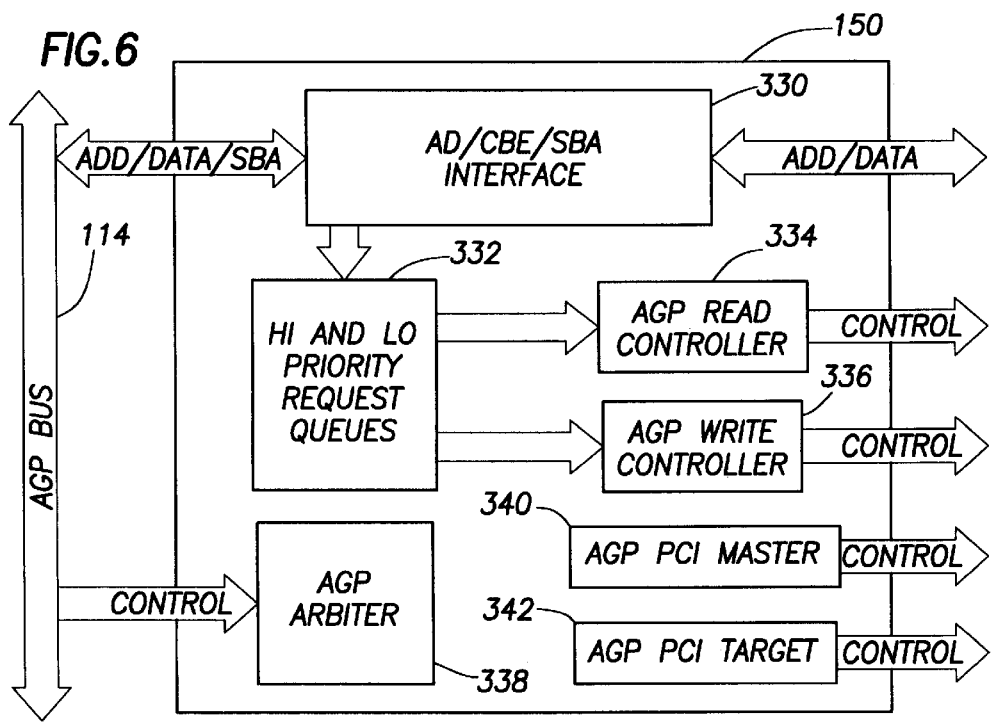

COMPUTER SYSTEM EMPLOYING MEMORY CONTROLLER AND BRIDGE INTERFACE PERMITTING CONCURRENT OPERATION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to computer systems and, more particularly, to integrated bus bridge designs for use in high performance computer systems. Still more particularly, the invention relates to the configuration and operation of a bus bridge to support multiple concurrent data transactions between a control processor, memory, a graphics controller and a peripheral bus.

2. Background of the Invention

Computer architectures generally include a plurality of devices interconnected by one or more buses. For example, conventional computer systems typically include a central processing unit ("CPU") coupled through bridge logic to main memory. A CPU bus usually is provided to couple the CPU to the bridge logic and a memory bus is provided to couple the bridge logic to the main memory. A main memory controller typically is incorporated within the bridge logic to generate various control signals for accessing the main memory. An interface to a high bandwidth local expansion bus, such as the Peripheral Component Interconnect ("PCI") bus, may also be included as a portion of the bridge logic. Examples of devices which can be coupled to the local expansion bus include network interface cards, video accelerators, audio cards, SCSI adapters, and telephony cards, to name a few. An example of such a bridge logic unit is described in U.S. Pat. No. 5,634,073, assigned to Compaq Computer Corporation, which includes interfaces to three busses—a CPU bus, memory bus, and a PCI bus.

An older-style expansion bus also may be supported through yet an additional bus interface to provide compatibility with earlier-version expansion bus adapters. Examples of such expansion buses include the Industry Standard Architectures (ISA) bus, the Extended Industry Standard Architecture ("EISA") bus, and the Microchannel Architecture (MCA) bus. Various devices may be coupled to this second expansion bus including a fax/modem, sound card, keyboard and mouse.

It would be desirable for the bridge logic to link or interface more than the CPU bus, a peripheral bus such as a PCI bus, and the memory bus. In applications that are graphics intensive, a separate peripheral bus optimized for graphics related data transfers may be provided in the computer system. A popular example of such a bus is the Advanced Graphic Port ("AGP") bus. The AGP bus is generally considered a high performance, component level interconnect bus optimized for three dimensional graphical display applications, and is based on a set of performance extensions or enhancements to the PCI standard. In part, the AGP bus was developed in response to the increasing demands placed on memory bandwidths for three dimensional renderings. With the advent of AGP, a graphics controller can be removed from the PCI bus (where it traditionally was located) to the AGP bus. AGP provides greater bandwidth for data transfer between a graphics accelerator and system memory than is possible with PCI or other conventional bus architectures. The increase in data rate provided by AGP allows some of the three dimensional rendering data structures, such as textures, to be stored in main memory, reducing the cost of incorporating large amounts of memory local to the graphics accelerator or frame buffer.

Although the AGP uses the PCI specification as an operational baseline, it provides three significant performance extensions or enhancements to that specification. These extensions include a deeply pipelined read and write operation, demultiplexing of address and data on the AGP bus, an alternating current (AC) timing for, e.g., 133 MHz data transfer rates. The bridge unit of U.S. Pat. No. 5,634,073 does not include an interface to an AGP bus.

Since computer systems were originally developed for business applications including word processing and spreadsheets, the bridge logic within such systems was generally optimized to provide the CPU with relatively good performance with respect to its access to main memory. The bridge logic generally provided relatively poor performance, however, with respect to main memory accesses by other devices residing on peripheral buses. Similarly, the bridge logic provided relatively poor performance with respect to data transfers between the CPU and peripheral buses as well as between peripheral devices interconnected through the bridge logic.

Recently, however, computer systems have been increasingly used in processing for various real time applications, including multimedia applications such as video and audio, telephony, and speech recognition. These systems require not only that the CPU have adequate access to the main memory, but also that devices residing on various peripheral buses such as an AGP bus and a PCI bus have fair access to the main memory as well. Furthermore, it is often important that transactions between the CPU, the AGP bus and the PCI bus be efficiently handled. Accordingly, the bus bridge logic for a modern computer system preferably should include mechanisms to efficiently prioritize and arbitrate among the varying requests of devices seeking access to main memory and to other system components coupled through the bridge logic.

In a computer system employing bridge logic coupling multiple buses, transactions between the various buses usually occur simultaneously. For example, the CPU may be writing data to main memory while a PCI master (a device coupled to the PCI bus controlling the operation of the bus) may be trying to supply data to a device on the CPU bus. Usually, a bus bridge processes one bus transaction at a time forcing all other transactions to wait their turn.

For the reasons discussed above, it would be advantageous to design a computer system that includes a bus bridge capable of coupling multiple buses and which attains high performance by allowing transactions between the buses to occur concurrently. Despite the advantages that such a system would offer, to date no such systems have been introduced.

SUMMARY OF THE INVENTION

The deficiencies of the prior art described above are solved in large part by a computer system including a bridge logic unit coupling together the CPU, the memory device, and multiple expansion buses. The CPU couples to the bridge logic unit via a CPU bus and the memory device couples to the bridge logic unit via a memory bus. In accordance with an exemplary embodiment of the present invention, one expansion bus is implemented as a peripheral component interconnect ("PCI") bus and the other expansion bus comprises an accelerated graphics port ("AGP") bus. The bridge logic unit (commonly referred to as a "North bridge") generally routes bus cycle requests from one of the four buses (CPU, memory, PCI, AGP) to another of the buses while concurrently routing bus cycle requests to another pair of buses. By permitting concurrent flow of cycle requests (which generally include write and read requests) between the four buses, overall system performance can be significantly increased.

The bridge logic unit preferably includes a CPU interface, a memory controller, an AGP bus interface, and a PCI bus interface. Each pair of interfaces (including the memory controller) are separately coupled by at least one queue. The queues temporarily store write requests and/or read data. Accordingly, the bridge logic unit includes a plurality of write queues for storing write requests from one interface to another, and a plurality of read queues for storing read data from one interface to another. By way of example, the CPU, PCI, and AGP interfaces couple to the memory controller via write queues in which each interface can concurrently store (or "post") memory write requests. The queues preferably provide the capacity to store two or more write requests (for the write queues) or read data streams (for the read queues).

Because each interface can communicate concurrently with all other interfaces (including the memory controller) via the read and write queues, the possibility exists that a first interface cannot access a second interface because the second interface is continuously processing read or write requests from a third interface. For example, a device coupled to the PCI bus may not be able to read from memory because the CPU is currently writing data to memory. In such a situation, the PCI device may become "starved" for memory access. To remedy such problems, the bridge logic unit places the third interface (the CPU interface in the example above) in a "no post" state, thereby preventing the third interface from posting additional write requests to its write queue and permitting the first interface (the PCI bus interface) access to the second interface (the memory controller).

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 5 is a block diagram of a preferred embodiment of the PCI interface for the bridge logic of FIG. 2;

FIG. 6 is a block diagram of a preferred embodiment of the AGP interface, for the bridge logic of FIG. 2;

DETAILED DESCRIPTION OF A PREFERRED EMBODIMENT

Figure 1:
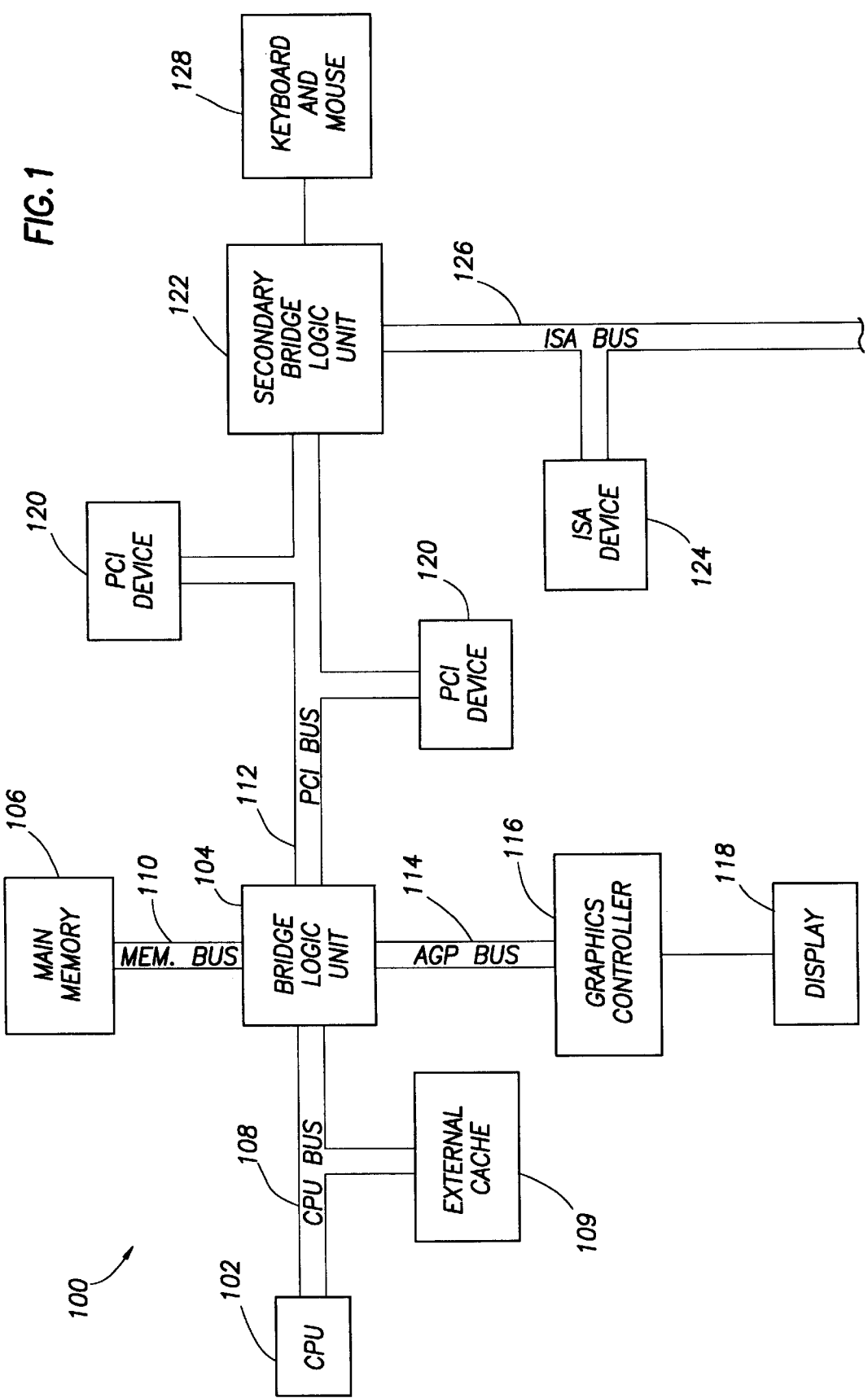
FIG. 1 is a block diagram of a computer system including an integrated bridge logic unit.

Referring now to FIG. 1, a computer system 100 constructed in accordance with a preferred embodiment generally includes a central processing unit ("CPU") 102 coupled to a variety of system components through an integrated bridge logic (or "North bridge") unit 104. The CPU 102 couples to the bridge logic unit 104 via a CPU bus 108. An external memory cache unit 109 may further be coupled to CPU bus 108. As shown, a main memory 106 couples to the bridge logic unit 104 through a memory bus 110, and a graphics controller 116 couples to the bridge logic unit 104 through an Advanced Graphics Port ("AGP") bus 114. A display device (or monitor) 118 couples to the graphics controller 116. Additionally, a plurality of Peripheral Component Interconnect ("PCI") devices 120 couple to the bridge logic unit 104 through a PCI bus 112.

A secondary bridge logic (or "South bridge") unit 122 also may be provided to accommodate an electrical interface to one or more peripheral devices 124 by way of an expansion bus 126. The expansion bus 126 may be implemented using any suitable bus type such as an Industry Standard Architecture ("ISA") bus or an Extended Industry Standard Architecture bus ("EISA"). As the exemplary embodiment of FIG. 1 shows, expansion bus 126 is implemented as an ISA bus and, accordingly, peripheral device 124 represents an ISA device such as a fax/modem or sound card.

In addition to providing an interface to an ISA or EISA bus, secondary bridge logic 122 may further incorporate additional functionality, as desired. For example, in one embodiment, secondary bridge logic unit 122 includes a master PCI arbiter (not shown) for arbitrating ownership of the PCI bus 112. Secondary bridge logic unit 122 may also incorporate a disk drive controller, an interrupt controller, and power management support functionality. An input/output controller (not shown), either external from or integrated with the secondary bridge logic unit 122, may also be included within computer system 100 to provide operational support for a keyboard and mouse 128 and for various serial and parallel ports, as desired.

Referring still to FIG. 1, the CPU 102 is illustrative of, for example, a Pentium® Pro Microprocessor. It should be understood, however, that other alternative types of microprocessors could be employed. Further, an embodiment of computer system 100 may include a multiple CPU architecture, with a plurality of processors coupled through the CPU bus 108 to the bridge logic unit 104.

The main memory 106 generally includes a conventional memory device or an array of memory devices in which application programs and data are stored. Computer system 100 includes any suitable type of memory such as dynamic random access memory ("DRAM") or any of the various types of DRAM circuits such as synchronous dynamic random access memory ("SDRAM").

The PCI devices 120 may include any of a variety of peripheral devices such as, for example, network interface cards, video accelerators, audio cards, hard or floppy disk drives, Small Computer Systems Interface ("SCSI") adapters and telephony cards. Although only two PCI device 120 are included in the embodiment illustrated in FIG. 1, it should be recognized that computer system 100 may include any number of PCI devices as desired.

Referring still to FIG. 1, the graphics controller 116 controls the rendering of text and images on display 118. Graphics controller 116 may embody a typical graphics accelerator generally known in the art to render three-dimensional data structures on display 118. These data structures can be effectively shifted into and out of main memory 106. The graphics controller 116 therefore may be a master of the AGP bus 114 in that it can request and receive access to a target interface within the bridge logic unit 104 to thereby obtain access to main memory 106. A dedicated graphics bus accommodates rapid retrieval of data from main memory 106. For certain operations, graphics controller 116 may further be configured to generate PCI protocol transactions on the AGP bus 114. The AGP interface of bridge logic 104 (described in greater detail below with reference to FIG. 6) may thus include functionality to support both AGP protocol transactions as well as PCI protocol target and initiator transactions. For the purpose of this disclosure, AGP-related transactions (i.e., transactions initiated by or targeted to the AGP bus) following the PCI protocol are referred to as "GCI" transactions. Display 118 is any electronic display device upon which an image or text can be represented. A suitable display 118 may include, for example, a cathode ray tube ("CRT"), a liquid display ("LCD"), or a virtual retinal display ("VRD"), or any other type of suitable display device for a computer system.

The following discussion describes an embodiment of computer system 100 for coupling together various computer buses. Computer system 100 can be implemented with respect to the particular bus architectures shown in FIG. 1 (i.e., PCI and AGP buses), or other bus architectures, as desired. The embodiment described herein, however, assumes buses 112 and 114 represent a PCI bus and an AGP bus, as shown in FIG. 1. Further, CPU 102 is assumed to be a Pentium® Pro processor and thus CPU bus 108 represents a Pentium Pro bus®. These bus protocols and the terminology used with respect to these protocols are well known to those of ordinary skill in the art. If a more thorough understanding of the PCI, AGP, or Pentium® Pro buses is desired, reference should be made to the *PCI Local Bus Specification* (1993), *Accelerated Graphics Port Interface Specification* (*Intel,* 1996), *and Intel P6 External Bus Specification.*

Figure 2:
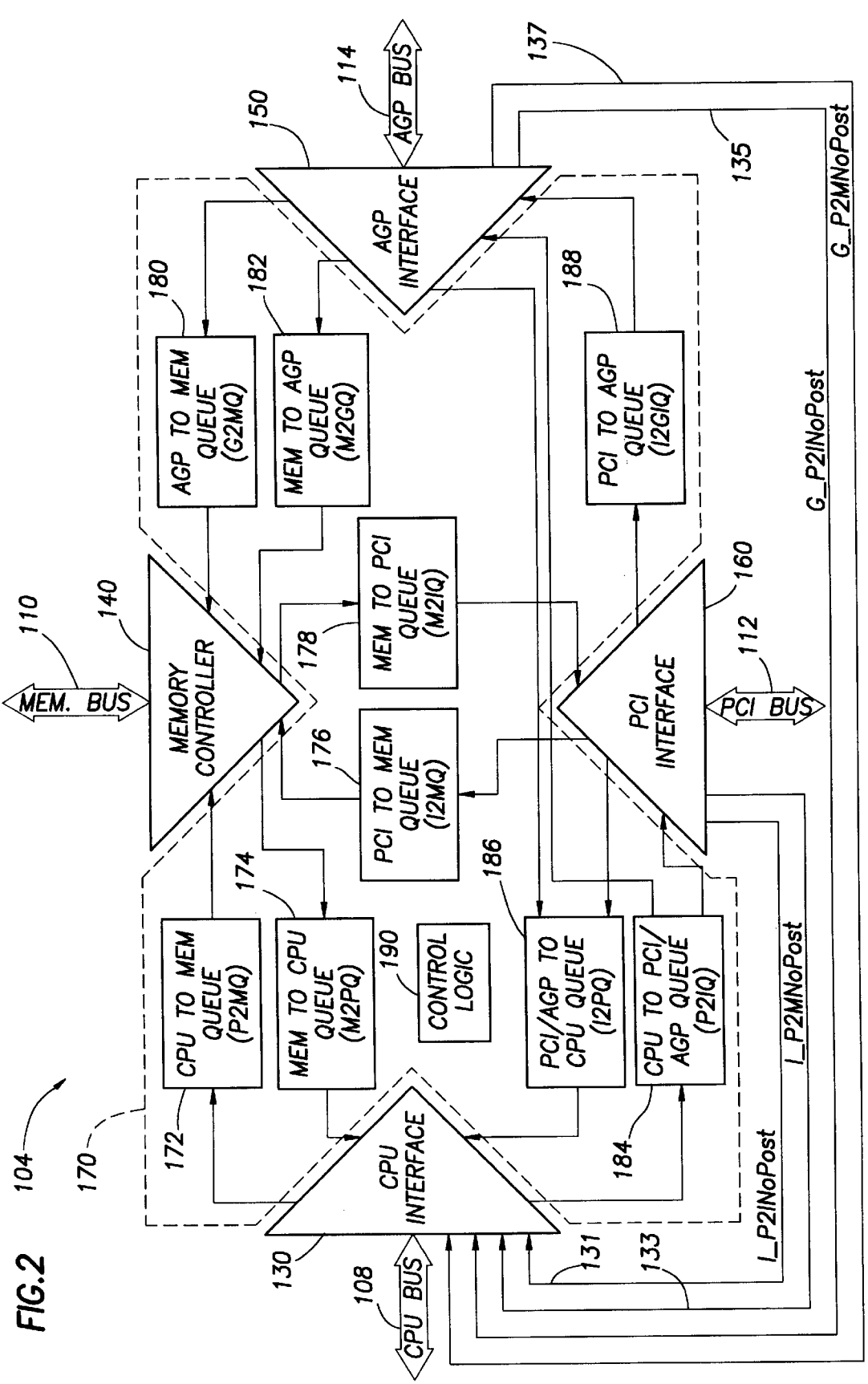
FIG. 2 is a block diagram of a preferred embodiment of the bridge logic unit of FIG. 1 including CPU, PCI, and AGP interfaces, a memory controller, and data and address queues between the interfaces and memory controller.

Referring now to FIG. 2, bridge logic unit 104 generally includes a CPU interface 130, a memory controller 140, an AGP interface 150, a PCI interface 160, and queue storage and control logic 170. As shown, the CPU interface 130 preferably couples the bridge logic unit 104 to the CPU bus 108 and also coordinates the transfer of data, address and control signals between the bridge logic 104 and CPU bus 108. The AGP interface 150 and PCI interface 160 in similar fashion interface the bridge logic 104 to the AGP bus 114 and PCI bus 112, respectively. Finally, the memory controller 140 couples to the memory bus 110 and communicates with main memory 106 (FIG. 1).

The queue storage and control logic 170 includes various queue storage elements interconnecting the CPU interface 130, memory controller 140, AGP interface 150, and PCI interface 160. A CPU-to-memory queue (P2MQ) and a memory-to-CPU queue (M2PQ) couple the CPU interface 130 to the memory controller 140. A PCI-to-memory queue (I2MQ) 176 and a memory-to-PCI queue (M2IQ) 178 couple the PCI interface 160 to the memory controller 140. An AGP-to-memory queue (G2MQ) 180 and a memory to AGP queue (M2GQ) 182 couple the AGP interface to the memory controller 140. The AGP interface 150 and the PCI interface 160 couple by way of a PCI to AGP queue (I2GIQ) 188. A CPU to PCI/AGP queue (P2IQ) 184 and a PCI/AGP to CPU queue (I2PQ) 186 couple the CPU interface 130 to the AGP interface 150 and the PCI interface 160 as shown. A control logic unit 190 controls the operation of the various queue storage elements. The input and output connections to the control logic unit 190 have been omitted from FIG. 2 for sake of clarity, but are included and described below with respect to FIGS. 7–11. Also omitted from the block diagram of FIG. 2 are various control signals between the interfaces 130, 150, 160 and memory controller 140. The relevant control signals, however, are also shown and described in relation to FIGS. 7–11.

Generally, the queue storage elements allow data and data transaction requests (such as CPU reads and writes to memory, PCI reads and writes to memory, etc.) to be temporarily stored pending execution by the destination device, thereby permitting the requesting device to perform other tasks until its transaction request is completed. Operation and storage of data transactions in the queue storage elements preferably occurs concurrently allowing data and data transaction requests (including addresses for write requests) among the interfaces 130, 150, 160 and the memory controller 140 to be stored within the bridge logic unit 104.

Concurrent storage of data and transaction requests in the queue storage elements 172, 174, 176, 178, 180, 182, 184, 186, and 188 means that each queue storage element can hold data and/or transaction requests at the same time. Thus each queue storage element can store data and/or requests independent of all other queue storage elements. By including queue storage elements between the interfaces 130, 150, 160 and memory controller 140 as shown in FIG. 2, and permitting each queue storage element to store data and transaction requests concurrently with all other queue storage elements, the performance of the computer system 100 can be improved. This improvement results from passing data and transaction requests between buses 108, 110, 112, 114 in a more efficient manner. Moreover, traffic between buses is handled more efficiently by maximizing the utilization rate of data paths between pairs of buses (i.e., the percentage of time data and transaction requests pass between one bus and another). For purposes of this disclosure, the terms "transaction" and "cycle" are generally used synonymously.

Referring still to FIG. 2, the bridge logic unit 104 implements several "no post" signals. The PCI interface 160 provides an I_P2INoPost signal 131 and an I_P2MNoPost signal 133 and the AGP interface 150 provides a G_P2INoPost 135 and a G_P2MnoPost signal 137 to the CPU interface 130. Upon the assertion of a no post signal, the CPU interface 130 that stops storing (or posting) new write request transactions to the queue associated with the particular no post signal. For example, when the PCI interface asserts I_P2INoPost, the CPU interface 130 stops posting write cycles to the P2IQ 184. The no post signals are particularly useful in a computer system in which a priority or arbitration scheme exists for the interfaces 130, 150, and 160. In such a prioritized system, certain higher prioritized transactions are completed before lower prioritized transactions. One problem with such a prioritized system is that low priority transaction requests may not be timely granted. The no post signals help remedy this problem and their use is described in greater detail below.

Figure 3:
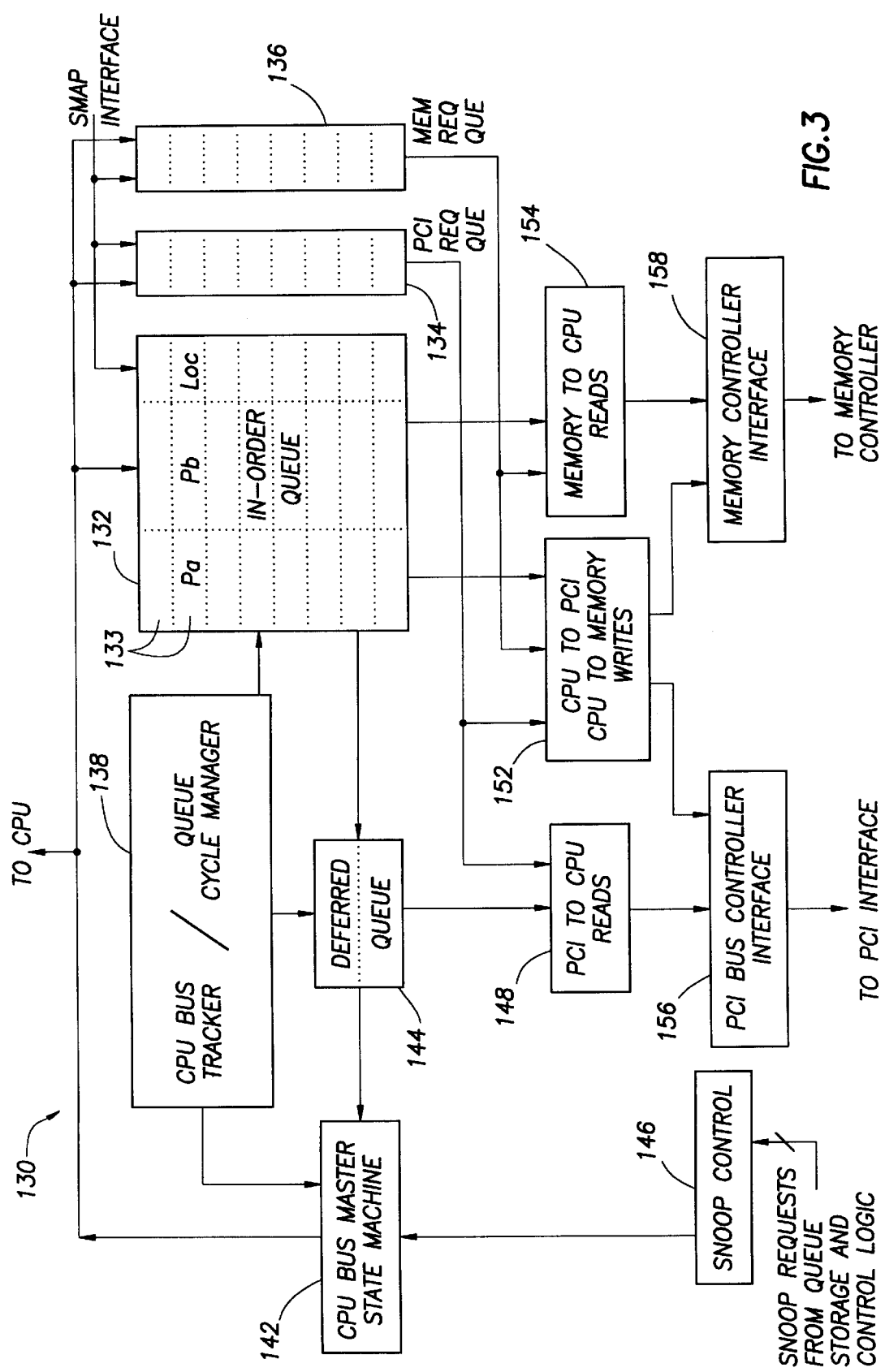
FIG. 3 is a block diagram of a preferred embodiment for CPU interface of the bridge logic of FIG. 2.

FIGS. 3–6 include exemplary block diagrams of the CPU interface 130 (FIG. 3), the memory controller 140 (FIG. 4), the PCI interface 160 (FIG. 5), and the AGP interface 150 (FIG. 6). Referring first to FIG. 3, the CPU interface 130 generally includes an in-order queue 132, a PCI request queue 134, a memory request queue 136, a CPU bus tracker/queue cycle manager 138, a CPU bus master state machine 142, deferred queue 144, snoop logic 146, PCI to CPU read logic 148, CPU to PCI and CPU to memory write logic 152, memory to CPU read logic 154, PCI bus controller interface 156, and memory controller interface 158. In accordance with a preferred embodiment of the invention, CPU cycles to main memory 106 and the PCI and AGP buses 112, 114 are processed by the CPU interface 130. Cycles from the CPU bus 108 (FIG. 1), under control of the CPU bus tracker/queue cycle manager 138 generally are placed into the in-order queue 132. Cycles going to the PCI bus 112 or memory bus 110 are also placed into the PCI request queue 134 or the memory request queue 136, respectively. The cycles are then de-queued (i.e., extracted) from the PCI request queue 134 and memory request queue 136 and transferred to the appropriate destination through the PCI to CPU read logic 148, CPU to PCI and CPU to memory write logic 152, or memory-to-CPU read logic 154.

As shown in FIG. 3, the in-order queue 132 includes one or more rows 133. Each row 133 preferably stores cycle information regarding a transaction on the CPU bus 108. The cycle information includes such information as cycle type, validity (indicated by a valid bit), and snoop results. All CPU bus cycles targeted for either the memory controller 140, AGP interface 150, or PCI interface 160 preferably are loaded into the in-order queue 132. A pointer (not shown) within the in-order queue 132 is incremented whenever a response to a CPU cycle is returned to the CPU 102. This pointer then points to the next row of storage of the next CPU bus cycle.

In addition to storage in the in-order queue 132, all cycle information regarding CPU transactions to the PCI bus 112 is also stored in the PCI request queue 134. Each entry within the PCI request queue 134 includes fields for the memory address, byte enables, cycle type, and valid bit, as one of ordinary skill in the art would understand. Similarly, all cycle information regarding CPU to main memory transactions preferably is stored in the memory request queue 136, as well as in the in-order queue 132. Each entry in the memory request queue 136 includes fields for the memory address, byte enables, cycle type, and valid (active) bit. While the in-order queue 132, PCI request queue 134, and memory request queue 136 are shown in FIG. 3 as including eight rows each for storing cycle information, it should be recognized that these queues (132, 134, 146) could alternatively include a different number of rows, as desired.

Referring still to FIG. 3, the CPU bus tracker and queue cycle manager 138 tracks the cycles on the CPU bus 108 that the CPU 102 runs, such as PCI reads, PCI writes, memory reads, and memory writes. Additionally, the CPU bus tracker and queue cycle manager 138 controls the flow of data through the queue storage and control logic 170 (FIG. 2) to the CPU 102. The CPU bus tracker and queue cycle manager 138 is responsible for loading the cycle information into the in-order queue 132 and tracking each cycle to completion.

The CPU bus master state machine 142 keeps track of the number of cycles stored in the in-order queue 132. If the CPU bus master state machine 142 determines that the in-order queue 132 is full, it preferably asserts a signal on the CPU bus 108 indicating that no new bus cycles are to be run on the CPU bus 108 through the bridge logic unit 104. This signal remains asserted until such time as the in-order queue 132 is no longer full.

The snoop control 146 tracks various snoop request signals from the queue storage and control logic 170 (FIG. 2). As discussed below, some of the queue storage elements shown in FIG. 2 assert a snoop request signal when main memory 106 is to be accessed, thus indicating the presence of a snoop condition. As one of ordinary skill in the art would understand, a snoop condition is present when data to be read or written to main memory 106 potentially resides in either cache memory internal to the CPU 102 or external cache memory 109 residing on the CPU bus 108. When the queue storage and control logic 170 asserts a snoop request signal, the snoop control 146 responds to that signal by initiating a snoop cycle on the CPU bus 108. The snoop control 146 may also include arbitration logic to determine which snoop request to run in the event that multiple snoop requests are pending. If included, the arbitration logic of the snoop control also arbitrates for deferred reply transactions on the CPU bus 108. The arbitration logic in the snoop control 146 defaults to deferred reply transactions when no other request is pending to optimize retiring these cycles because they may be stalling the CPU 102.

Referring now to FIGS. 2 and 3, PCI-to-CPU read logic 148 and CPU-to-PCI and CPU-to-memory write logic 152 transfer PCI read and write requests, respectively, from the PCI request queue 134 to the PCI bus controller interface 156. In turn, the PCI bus controller interface 156 transfers the CPU-to-PCI/AGP read and write requests to the PCI interface 160, or AGP interface 150, through the queue storage and control logic 170 (as will be explained below with reference to FIGS. 11 and 12). Generally, CPU-to-PCI write requests are placed in the CPU-to-PCI/AGP queue 184 and CPU to PCI read requests are transferred directly to the PCI interface 160 for execution. In accordance with a preferred embodiment, CPU read and write requests to the AGP bus are performed in a similar fashion and also use the CPU-to-PCI/AGP queue 184 for CPU to AGP transaction requests.

CPU-to-memory read and write requests are de-queued (i.e., extracted) from memory request queue 136 and transferred to the memory controller interface 158 through the CPU-to-PCI and CPU-to-memory write logic 152 and the memory-to-CPU read logic 154. In response, CPU-to-memory read and write requests are transferred from the memory controller interface 158 to the memory controller 140 via the queue storage and control logic 170.

Figure 4B:
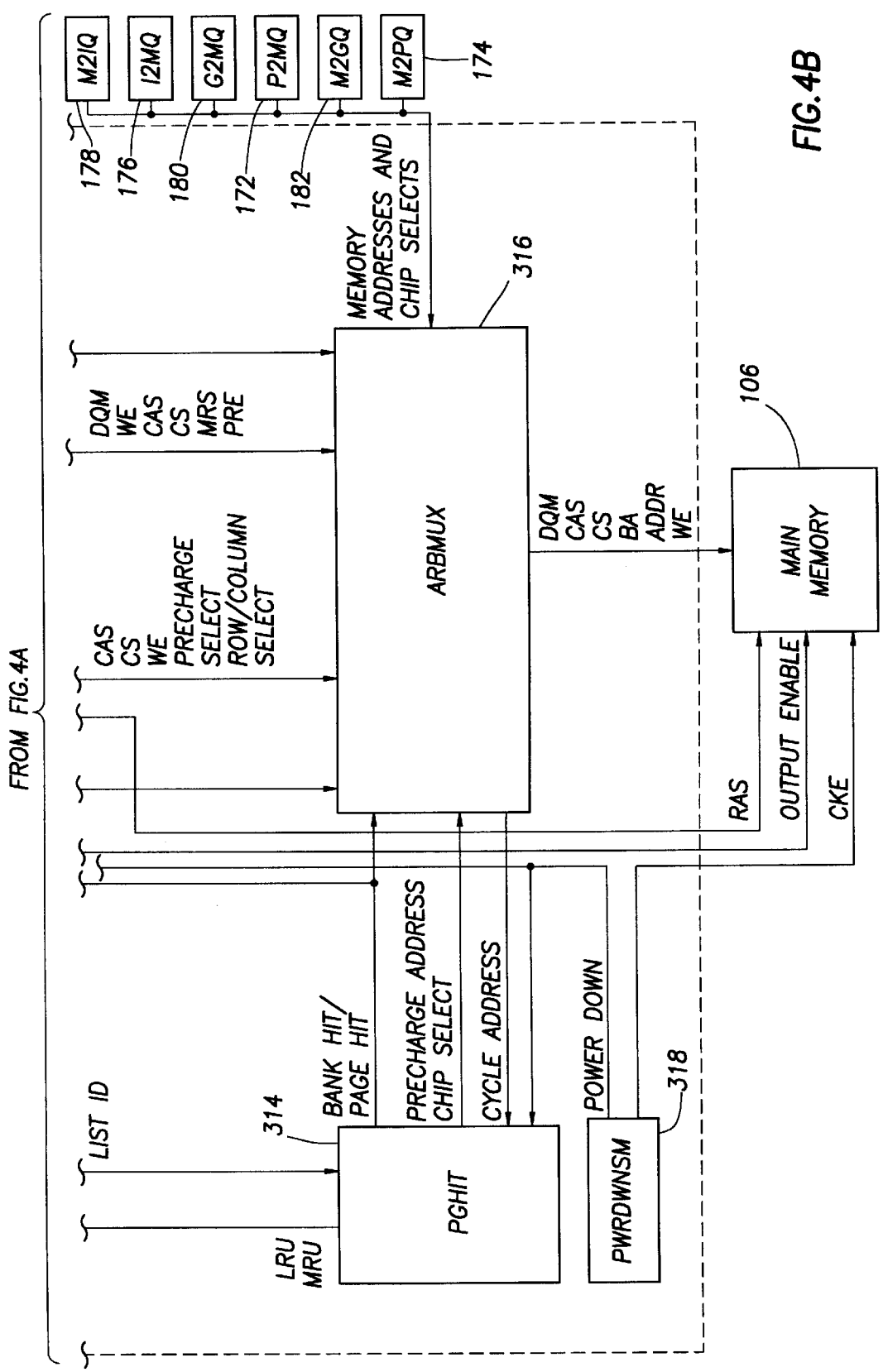
FIG. 4 is a block diagram of a preferred embodiment of the memory controller for the bridge logic of FIG. 2.

Referring now to FIG. 4, the memory controller 140 preferably includes a number of state machines which comprise logic units whose output values depend on the state of the present input values as well as previous input values. The exemplary embodiment shown in FIG. 4 includes a memory ready state machine (MRDY) 302, a memory arbitration state machine (MEMARB) 304, a refresh control state machine (RFSHCNTR) 306, an SDRAM state machine (SDRAMSM) 308, an initialize state machine (INITSM) 310, a memory refresh state machine (RFSHSM) 312, a page hit logic (PGHIT) 314, an arbitration multiplexer (ARBMUX) 316, a power-down state machine (PWRDWNSM) 318, a least recently used tracker state machine (LRUTSM) 320, a command delay state machine (CMDDELSM) 322, and a precharge state machine (PRESM) 324. Each state machine in FIG. 4 couples to one or more other state machines or external interfaces, queues, or configuration registers. The connections between the various state machines, interfaces, and registers may either reflect actual signals or logical states or flags in accordance with known techniques. For simplicity, the following discussion describes the memory controller 140 in terms of input and output signals between state machines.

The MEMARB state machine 304 receives memory request input signals from the RFSHCNTR 306, CPU interface 130, AGP interface 150, the PCI interface 160, as well as the CPU-to-memory queue 172, the PCI to memory queue 176, and the AGP to memory queue 180.

The MEMARB state machine 304 also receives CAM hit indicator signals from the CPU to memory queue 172 and from the AGP-to-memory queue 180. The MEMARB 304 asserts a who-won signal to the SDRAMSM 308, CMDDELSM 322, RFSHSM 312, ARBMUX 316, and LRUTSM 320. The MEMARB 304 also produces a distinct select signal for each of the MRDY 302 state machines. The ARBMUX 316 receives memory addresses from the CPU-to-memory queue (P2MQ)172, the memory-to-CPU queue (M2PQ) 174, the PCI-to-memory queue (I2MQ) 176, the memory-to-PCI queue (M2IQ) 178, the AGP-to-memory queue (G2MQ)180, and the memory-to-AGP (M2GQ) queue 182. The ARBMUX 316 provides a cycle address signal to the PGHIT 314, while generating data mask (DQM), column address strobe (CAS), chip select (CS), address (ADDR), and write enable (WE) signals to main memory 106.

The SDRAMSM state machine 308 couples to the arbitration multiplexer (ARBMUX) 316, providing the CAS, CS, WE, precharge select, and row/column select signals to the ARBMUX 316. These signals are used by ARBMUX 316 to run cycles to main memory, as described in more detail below. The SDRAMSM state machine 308 additionally asserts the row address strobe (RAS) signal, which directly couples to main memory 106. The SDRAMSM state machine 308 also transmits a read/write cycle indicator signal to the MRDY 302 and the CMDDELSM state machines 322. The INITSM 310 couples to the arbitration multiplexer (ARBRMuX) 316, providing the DQM, WE, CAS, CS, MRS, and PRE signals to ARBMUX 316. These signals are used by the ARBMUX to run cycles to main memory, as described in more detail below. The SDRAMSM 308 and IMTSM 310 preferably assert precharge cycle indicator signals to the PRESM state machine 324.

The RFSHSM state machine 312 asserts CAS and CS signals to the ARBMUX 316. The RFSHSM state machine 312 also asserts a refresh acknowledge signal to RFSHCNTR 306. The PGHIT state machine generates signals indicating if a memory cycle is being run to a bank or page of memory that has already been targeted in a recent memory cycle. The PGHIT state machine 314 produces bank hit and page hit indicator signals to CMDDELSM 322, SDRAMSM 308, and to ARBMUX 316 indicating if a memory cycle is to a bank or page currently open. The PGHIT state machine 314 also asserts precharge, address and chip select signals to the ARBMUX 316. The PGHIT 314 also transmits a least recently used (LRU) hit signal and a most recently used (MRU) hit signal to LRUTSM 320 to indicate a hit to those ages of memory that are open. The LRUTSM 320 generates a list ID signal for the PGHIT 314 so PGHIT 320 can determine which open page is hit, or any. The LRUTSM state machine 320 also asserts a force precharge signal to SDRAMSM 308. The CMDDELSM 322 provides read begin, write begin, and precharge begin indicators to the SDRAMSM 308. The PRESM 324 produces a precharge release indicator for the SDRAMSM 308. Each MRDY 302 asserts a data-ready signal to the memory to CPU queue 174, memory to PCI queue 178, memory to AGP queue 182, CPU interface 130, AGP interface 150, or PCI interface 160. Finally, the PWRDWNSM 318 provides a CKE signal to main memory 106 as well as a power-down indicator to RFSHSM 312, SDRAMSM 308, PGHIT 314, and LRUTSM 320.

The MEMARB state machine 304 performs memory arbitration for the memory controller 140. The MEMARB 304 preferably receives memory request signals from the RFSHCNTR 306, CPU interface 130, AGP interface 150, PCI interface 160, as well as CPU to memory queue 172, PCI to memory queue 176, and AGP to memory queue 180. The MEMARB 304 also receives CAM hit signals from the CPU to memory queue 172 and from the AGP to memory queue 180. The CAM hit signals preferably are asserted when a read cycle is requested to an address that also corresponds to a write cycle concurrently posted in a queue.

According to known arbitration techniques, the MEMARB 304 uses the memory request and CAM hit signals to determine which request to perform. The MEMARB 304 thereby generates the who-won signal corresponding to the winner of the arbitration. If a read request wins memory arbitration, the MEMARB state machine 304 generates a select signal that activates an MRDY 302 associated with that read request. The MEMARB 304 also couples to main memory 106 through input/output (I/O) buffers via the output enable signal, which allows the bridge 104 to receive and transmit data. The MEMARB 304 also generates the appropriate request acknowledge and de-queue signals to the various interfaces and queues as explained in detail below with respect to FIGS. 7–11.

If implemented as DRAM, main memory 106 must undergo a conventional refresh process within a predetermined time interval following the previous refresh in order for the memory to maintain its data, as would be recognized by one of ordinary skill in the art. The RFSHCNTR state machine 306 generates timely refresh requests to MEMARB 304. First, the RFSHSM state machine 312 notifies RFSHCNTR 306 via the refresh acknowledge signal when RFSHSM 312 submits a particular refresh cycle to ARBMUX 316 for execution in main memory 106. Next, after waiting for the predetermined time interval, RFSHCNTR 306 broadcasts a refresh request to MEMARB 304 via a request signal. During the next available memory cycle, MEMARB 304 commands RFSHSM 312 via the who-won signal to submit the refresh cycle to ARBMUX 316. The RFSHSM 312 then submits the request to ARBMUX 316 via CAS and CS signals and asserts the refresh acknowledge signal to alert RFSHCNTR 306 of the refresh cycle submission so that the refresh request signal can be deasserted. The entire refresh request cycle continues to repeat accordingly.

In accordance with the preferred embodiment, the ARBMUX state machine 316 asserts the DQM, CAS, CS, CE, ADDR, and WE signals which open desired locations in main memory 106. First, ARBMUX 316 receives the who-won signal from MEMARB 304, indicating which memory cycle request has won arbitration. Depending on the arbitration winner, ARBMUX 316 translates the DQM, CAS, CS, CE, ADDR, and WE signals from either the CAS and CS signals provided by RFSHSM 312, the CAS, CS, WE, precharge select and row/column select signals generated by SDRAMSM 308, the precharge address and chip select from PGHIT 314, or the memory address and chip select signals produced by the P2MQ 172, the M2PQ 174, the I2MQ 176, the M2IQ 178, the G2MQ 180, or the M2GQ 182.

According to standard convention, a location in main memory 106 must undergo an activation process that opens, or allows access to, that location before data can be read from or written to that location; however, only a limited number of memory locations can remain open concurrently. Thus, when a memory-cycle demands access to an unopened location in main memory 106 and if main memory 106 already has open the maximum number of memory locations, main memory 106 must close, or precharge, at least one memory location before the memory controller 140 can activate the new memory location and thereby gain access to its data. During a memory cycle, ARBMUX 316 generates a cycle address signal, received by the PGHIT state machine 314, that identifies the memory location that ARBMUX 316 intends to access. The PGHIT logic 314 compares the address of the requested memory location to a list of recently used addresses and determines whether or not the memory location was left open.

The PGHIT 314 will then transmit to the LRUTSM 320 page hit/bank hit indicators so that the LRUTSM can properly adjust its list of recently used pages and banks. If the address is to a new location to be opened, the PGHIT logic 314 places the memory address on a list of recently accessed memory locations. If the memory address corresponds to a location not left open and if the main memory 106 has reached the maximum number of open memory locations, LRUTSM 320 asserts a force precharge signal to SDRAMSM 308, indicating that SDRAMSM 308 must send a precharge command to ARBMUX 316, thereby closing an old memory location to permit a new memory location to be opened. The LRUTSM logic 320 also generates LRU and MRU signals for the PGHIT 314, which identify, respectively, the Least Recently Used and Most Recently Used memory locations on the PGHIT 314 list. Finally, the PGHIT 314 transmits bank hit and page hit signals to ARBMUX 316 and SDRAM 308 that indicate whether the current memory location should undergo precharge.

The SDRAMSM state machine 308 initiates activate, precharge, read, and write commands given to the main memory 106 by asserting the RAS signal directly to the main memory 106 and generating the CAS, CS, WE, precharge select, and row/column select signals received by ARBMUX 316. The RAS signal, along with the ARBMUX 316 output signals, define the exact memory location required by the current memory cycle request. During a precharge cycle, SDRAMSM 308 asserts a precharge cycle indicator to the PRESM state machine 324. The PRESM 324 then waits until a predetermined amount of time has elapsed before asserting the precharge release indicator to SDRAMSM 308, permitting SDRAMSM 308 to start a new memory cycle. In addition, at the beginning of a read or a write cycle, SDRAMSM 308 transmits a read/write cycle indicator to the CMDDELSM state machine 322. The CMDDELSM 322 then waits until a predetermined amount of time has elapsed before asserting the read begin, write begin, and precharge begin signals, which give permission for the SDRAMSM 308 to issue the next read, write, or precharge command, respectively. Using this technique in conjunction with the bank hit and page hit indicators that PGHIT 314 transmits to SDRAMSM 308 and CMDDELSM 322, CMDDELSM 322 and PRESM 324 allow SDRAMSM 308 to temporally separate and/or sustain read, write, and precharge commands. Accurate timing of these commands allows the memory controller 140 to properly couple with the main memory 106.

If the current memory cycle is a read cycle, the MRDY 302 associated with the current read cycle receives the read/write cycle indicator from SDRAMSM 308. A read/write cycle indicator instructs the MRDY 302 to notify its associated queue and interface, via its data-ready signal, that read data is available from main memory 106. There may be an MRDY 302 for each type of read cycle, and a single MRDY 302 couples with either the memory to CPU queue 174, memory to PCI queue 178, or memory to AGP queue 182, and also with either the CPU interface 130, AGP interface 150, or PCI interface 160.

When the main memory 106 first powers on, it must undergo a special sequence of initialization commands that prepare it for operation. The INITSM state machine 310 generates the initialization command sequence via DQM, WE, CAS, CS, MRS, and PRE signals, which it delivers to ARBMUX 316. The ARBMUX 316 accordingly routes these signals from INITSM 310 to main memory 106. The INITSM 310 also provides a precharge signal for PRESM 324, so that PRESM 324 can control the timing of the precharge command as discussed previously.

The PWRDWNSM state machine 318 provides a clock enable (CKE) signal to main memory 106 which allows main memory 106 to enter a power-down mode, thereby reducing energy consumption. When PWRDWNSM 318 deasserts CKE, PWRDWNSM 318 also sends a power-down indicator signal to RFSHSM 312, SDRAMSM 308, PGHIT 314, and LRUTSM 320 to signal these state machines that main memory is unavailable. Further, if a refresh cycle is needed while in the power-down mode, PWRDWNSM 318 exits the power-down made to let the refresh cycle execute. Then, power-down is re-entered.

Referring now to FIG. 5, the PCI interface 160 generally includes three main components: the PCI master interface 202, the PCI glue logic 224, and the PCI target interface 240. The PCI master interface 202 runs when the CPU 102 initiates transactions to be run on the PCI bus 112. The PCI target interface 240 is operative when a device coupled to the PCI bus 112 obtains ownership of the PCI bus (also referred to as a "PCI master") and initiates a cycle to access main memory 106 or the internal registers (not shown) of the PCI interface 160, or initiates cycles to the AGP bus 114. Preferably, only one of the PCI master and PCI target interfaces 202, 240 are active at a time. However, if the CPU 102 accesses the internal registers of the PCI interface 160 while the PCI target interface 240 is running, then both the PCI master and target interfaces 202, 240 will be active simultaneously.

The PCI glue module 224 includes an output multiplexer, master and target interfaces, and other components. The PCI glue module 224 preferably provides an interface structure between the PCI master interface 202 and PCI target interface 240.

Referring now to FIGS. 1 and 5, the bridge logic unit 104 preferably operates in a PCI master mode when a CPU initiated cycle is running on the PCI bus 112. These cycles may include non-local memory accesses (e.g., cycles to expansion memory cards coupled to the PCI bus), input/output ("I/O") cycles, PCI configuration cycles, special cycles, and interrupt acknowledge cycles. The PCI master interface 202 generally includes a master command module 204, a master state PCI bus/lock tracking module 218, a CPU to PCI nopost counter 220, and a PCI master latch 222.

The master command module 204 is responsible for controlling the PCI master mode signaling, the address and data path for CPU to PCI and PCI to CPU transfers, abort logic for aborting CPU to PCI transfers, and the PCI to memory no post and flush logic (explained in greater detail below). The master state PCI bus/lock tracking module 218 tracks the state of the control signals on the PCI bus 112 and the state of the PCI bus LOCK signal. The PCI master latch 222 latches the state of all of the PCI bus 112 input signals that are needed by the bridge logic unit 104 when operating as a PCI master device. The CPU to PCI nopost counter 220 generally forces postable CPU 102 to PCI bus 112 write cycles into non-posted cycles that are not permitted to be temporarily stored (i.e., posted) in the CPU to PCI/AGP queue 184 (FIG. 2) for subsequent processing through the PCI interface 160. This no post condition is useful to effectuate strong write ordering with the PCI to memory cycles and to allow the CPU to PCI/AGP queue 184 (FIG. 2) to flush (i.e., execute all cycles pending in the pending). Strong write ordering means that all devices in the computer system see the write requests in the same order. The conditions for no posting certain bus cycles are discussed in greater detail below.

The bridge logic unit 104 operates as a PCI target device when a device asserts mastership of the PCI bus 112 or when the CPU accesses internal registers (not shown specifically) in the PCI interface 160. For example, the bridge logic unit 104 operates as a target device for a PCI master access to main memory 106. If both read and write requests between the CPU interface 130 and the PCI interface 160 are pending, the PCI interface 160 services them in the order in which they are received from the CPU interface 130.

Referring now to FIG. 6, the AGP interface 150 generally includes an address/CBE/SBA interface 330, a high and low priority request queues 332, an AGP read controller 334, an AGP write controller 336, AGP arbitration logic 338, a PCI master interface 340, and PCI target interface 342. The AGP interface preferably supports both AGP and PCI protocol transactions. The AGP transactions generally operate at 66 MHz or 133 MHz based on configuration setup of the computer system 100. PCI transactions on the AGP bus preferably run at 66 MHz. AGP address, data, and side band addressing ("SBA") information is provided to the address/CBE/SBA interface 330 from the AGP bus 113. An AGP master device (a device asserting ownership of the AGP device) may request an AGP transaction by posting address, size and cycle type information through the address/CBE/SBA interface 330 to the high and low priority request queues 332. Generally, the AGP interface 150 responds to the request from the AGP master and retires the request by running the data phase of the AGP transaction in accordance with known AGP protocol.

Referring still to FIG. 6, when a request is asserted on the AGP bus 114 by an AGP master, the address, command type and transfer length information are stored in an appropriate high and low priority request queue 332, with high priority requests stored in a high priority queue and low priority requests stored in a low priority queue. As additional AGP transaction requests are initiated by an AGP master, each request stacks behind the previous requests in the appropriate high or low priority request queues 332.

When multiple requests are stacked in the high and low priority request queues 332, the possibility exists that AGP requests will be retired out of order. An AGP write request is retired when the data transfer associated with the request begins, indicating that the request slot in the high and low priority queues 332 is ready to accept the next transaction request. Similarly, AGP of read requests are considered retired when the AGP interface 150 transfers the first double word of read data across the AGP bus to the requesting device. The maximum number of requests that can be queued in the APG interface 150 preferably is eight, although a different queue size may be used if desired. It is the responsibility of the AGP master to ensure that no more than the maximum number of AGP requests are queued in the high and low priority request queues 332 at any time.

As each address is stored in the high and low priority request queues 332, the address is decoded to determine whether graphics address translation is required, whether the transaction crosses a page boundary of main memory 106, and whether other known cycle attributes such as read/write and priority exist. These attributes are also queued in the high and low priority request queues 332 to be used by the read and write controllers 334, 336 when the transaction is processed.

If the next request in the high or low priority request queue is a read, the AGP read controller 334 requests a Graphics Address Remapping (GART) translation (i.e., a translation of the cycle's address to a physical memory address) as would be understood by one skilled in the art. At the same time, the request is decoded by the read controller 334 to determine the number of memory cycles (cacheline reads) required to retire the AGP transaction and assorted data phase parameters. These calculations are based on the AGP request address and the transfer length. When the GART translation is complete, the read controller 334 loads the cacheline read counter with the cacheline count, enqueues data phase parameters and begins the GART translation for the next read request. The cachline read counter will request cacheline reads from memory until the transaction cacheline reads are complete. When the last cacheline is read from memory, the read controller loads the cacheline read counter with the next count and the next set of memory reads begins. When sufficient read data has been returned from memory for the first transaction, a request is sent to the AGP arbiter 338 to request access to the address/data (AD) bus. As soon as the arbiter 338 issues the read grant, the data phase begins with the aid of the data phase parameters that were previously enqueued. Once the transaction data phase has completed, the data phase parameters are de-queued and the next transaction data phase begins.

All read requests to memory are preferably 32 byte address aligned. If any residual read data is left at the end of the transaction due to a non-cacheline aligned request address, it will be discarded before the next data phase begins.

Referring still to FIG. 6, if the next request in the high or low priority request queue is a write, the AGP write controller 336 requests a GART translation. At the same time, the request is decoded to determine the number of memory cycles (cacheline writes) required to retire the AGP transaction and assorted data phase parameters. This calculation is based on the AGP request address and the transfer length. When the GART translation is complete, the write controller 336 loads the cacheline write counter with the cacheline count, pipelines the data phase parameters and begins the GART translation for the next write request. As soon as the cacheline write counter is loaded, a request is sent to the AGP arbiter 338 to request access to the AD bus. When the write grant is issued, the data phase begins with the aid of the data phase parameters that were previously pipelined. Once the transaction data phase has completed, the data phase parameters are updated and the next transaction data phase begins. During each transaction data phase, the write controller 336 queues the write data in the AGP to memory queue 180 (FIG. 2) where it is gathered for cacheline writes to memory. Byte enables are passed with each quad word transfer to the AGP to memory queue 180 enabling the AGP target interface 150 to write as few or as many bytes as necessary to complete the write request. The AGP to memory queue 180 preferably initiates writes to main memory 106 following each cacheline or the end of the transaction. The AGP arbiter logic 338 arbitrates for ownership of the AGP bus 114. Any suitable arbitration scheme may be implemented in accordance with the present invention.

The AGP PCI master interface 340 and the AGP PCI target interface 342 are functionally similar to the PCI master 202 and the PCI target 240 that form part of the PCI interface 160, described above. Generally, the AGP PCI master 340 runs when the CPU 102 initiates transactions to be run on the AGP bus 114. The AGP PCI target interface 342 runs when an AGP master initiates a cycle to access main memory 106 or internal registers (not shown) of the AGP interface 150. Preferably, only one of the AGP PCI master interface 340 and AGP PCI target interface 342 are active at a time. However, if the CPU 102 accesses the internal registers of the AGP interface 150 while the AGP PCI target interface 342 is running, then both the AGP PCI master and target interfaces 340, 342 preferably are active simultaneously.

FIGS. 7–11 illustrate the manner in which transactions between buses 108, 110, 112, 114 are proceed through the bridge logic unit 104. Referring first to FIG. 2, transactions generally can pass in either direction between a pair of interfaces. For example, CPU 102 write to main memory 106 cycles flow through the CPU to memory queue 172 from the CPU interface to the memory controller 140. CPU read requests to memory result in read data flowing in the opposite direction from the memory controller 140 to the CPU interface 130 via the memory to CPU queue 174. By way of further example, PCI to memory read and write cycles are transferred between the PCI interface 160 and the memory controller 140 through the memory to PCI queue 178 for read data and the PCI to memory queue 176 for write requests. Cycles between the CPU interface 130 and the AGP and PCI interfaces 150, 160, pass through the CPU to PCI/AGP queue 184 and the PCI/AGP to CPU queue 186. Further, PCI to AGP cycles are passed through the PCI to AGP queue 188 between the PCI interface 160 and AGP interface 150.

In accordance with a preferred embodiment of computer system 100, data and transaction requests between buses 108, 110, 112, and 114 advantageously occur concurrently. As explained above, concurrent data and transaction flow through the bridge logic unit 104 means that all or a portion of a stream of read data or a transaction request (e.g., a write request) passes through the bridge logic unit 104 between a pair of buses at the same time that all or a portion of a data stream or transaction request passes through bridge logic unit 104 between the same or different pair of buses. Further, each queue storage element preferably includes at least two rows of storage capacity, thereby permitting all or a portion of multiple data or transaction requests to be posted (i.e., temporarily stored) in the queue storage elements. Consequently, queue storage elements 172, 174, 176, 180, 182, 184, 186, 188 (FIG. 2) permit the bridge logic unit 104 to concurrently store numerous cycle requests or data streams allowing cycle requesting and cycle target devices coupled to the CPU, PCI, and AGP buses 108, 112, 114 to perform other tasks while their cycle requests and/or data are pending within the bridge logic unit 104.

Figure 7:
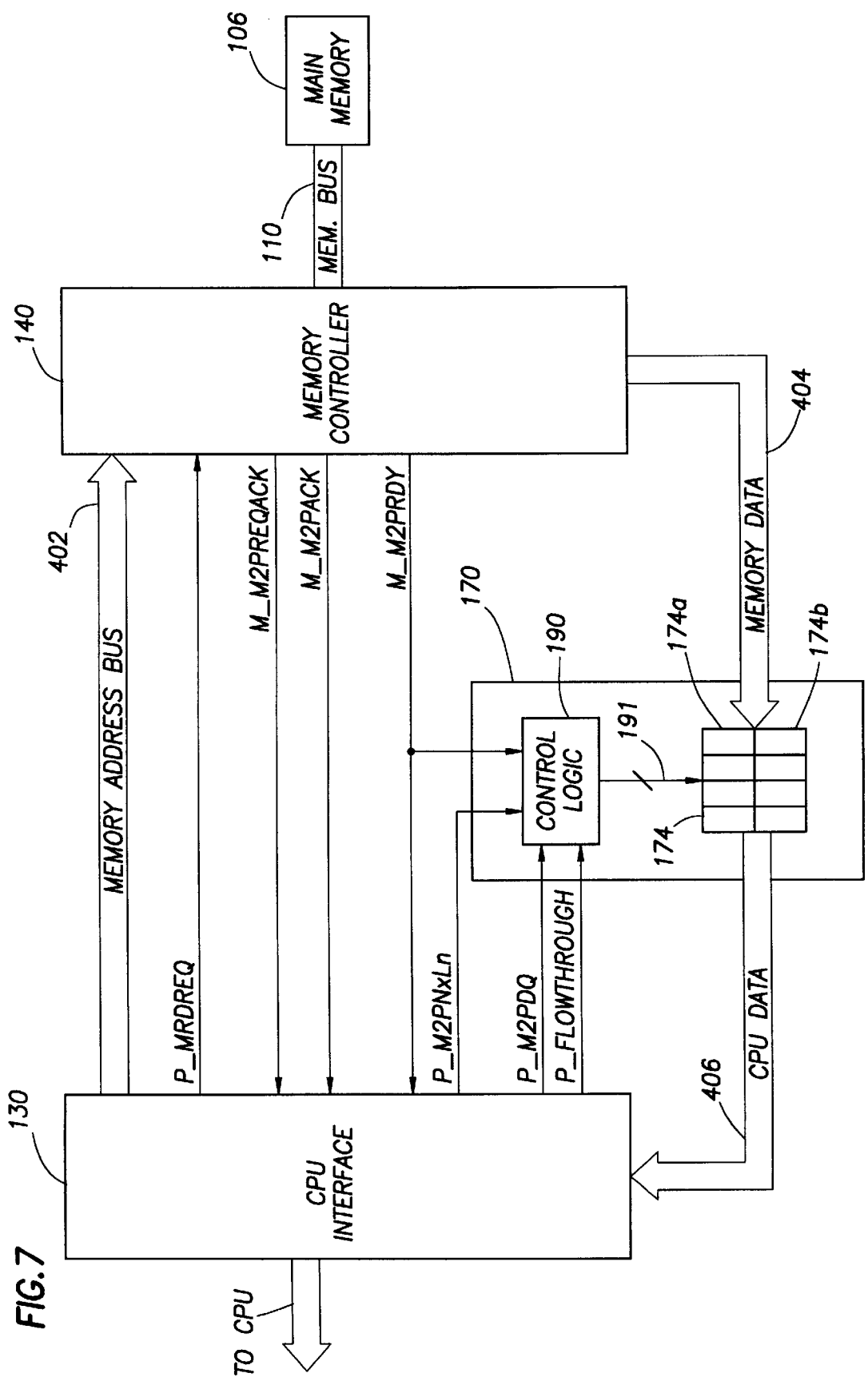
FIG. 7 is a block diagram of an exemplary implementation of a CPU to memory read transaction.

Referring now to FIG. 7, a processor to memory read cycle is illustrated. AGP read cycles using the memory-to-AGP queue 182 (FIG. 2) are performed the same way and will be understood once the processor to memory read cycle is explained. The CPU interface 130, the memory controller 140, and the queue logic and control 170 are coupled via memory address bus 402, data buses 404 and 406, and a number of control signals. The CPU interface 130 couples to the memory controller via memory address bus 402 and the control signals P_MRdReq, M_M2PReqAck, M_M2PAck, and M_M2PRdy. The M_M2PRdy signal also is provided as an input signal to the control logic 190 within the queue logic and control 170. Data from main memory 106 is provided from the memory controller 140 to the memory-to-CPU queue 174 via memory data bus 404. A CPU data bus 406 also couples the CPU interface to the memory-to-CPU queue 174. The CPU interface 130 also provides P_M2PnxLn, P_M2PDQ, and P_FlowThrough control signals to the control logic 190.

When the CPU interface 130 decodes a CPU cycle as a memory read, the CPU interface 130 asserts a P_MRdReq signal to the memory controller 140 indicating to the memory controller 140 that the CPU desires to read data from main memory 106. At substantially the same time, the CPU interface 130 places the address of the memory location from which the data is to be read on the memory address bus 402. The CPU interface 130 preferably maintains the address on the memory address bus until the memory controller 140 has latched in the address and indicates it no longer needs the CPU interface 130 to maintain the address on the memory address bus 402.

When the memory controller 140 determines that the CPU read request has the highest priority among any other pending memory access cycles, the memory controller latches in the address from the memory address bus 402 and asserts the M_M2PReqAck back to the CPU interface 130 to inform the CPU interface that the read request has been accepted and will be the next memory cycle run by the memory controller 140. The CPU interface 130 preferably then de-asserts the P_MRdReq signal if it does not require any additional data from memory. Once the memory cycle is ready to begin, the memory controller 140 asserts the M_M2PAck to the CPU interface 130 as an indication to the CPU interface that it no longer needs to maintain the address on the memory address bus. The memory controller 140 then initiates the memory read cycle by asserting the appropriate control and address signals to the main memory 106. If the main memory is implemented as synchronous DRAM, for example, the memory controller 140 issues a READ command to the memory in accordance with conventional SDRAM operation.

Referring still to FIG. 7, when the desired data from main memory 106 becomes available to the memory controller 140, the memory controller places the data on the memory data bus 404 and asserts a M_M2PRdy signal to both the CPU interface 130 and to the control logic 190. The M_M2PRdy signal indicates that the memory controller 140 has received the data requested by the CPU from main memory 106 and is ready to be sent to the CPU interface 130. The data may be provided to the CPU interface 130 using one of at least two techniques. One technique is to temporarily store the data in the memory-to-CPU queue 174 for subsequent retrieval by the CPU interface 130. In this method the data is stored in the memory-to-CPU queue 174 by the memory controller 140 when the CPU interface 130 is not ready to accept the data. The CPU interface 130 can subsequently de-queue the data from the memory-to-CPU queue 174. Alternatively, the data may be read around the memory-to-CPU queue 174 through the memory data bus 404 to the CPU data bus 406 without being temporarily stored in the memory to CPU queue 174. The later read-around technique advantageously reduces latency during a read cycle and may be preferred when the CPU interface 130 is ready to accept read data at substantially the same time that the memory controller 140 is ready to provide the data. By asserting the P_FlowThrough signal to the control logic 190, the CPU interface 130 controls whether the data from the memory controller 140 is to be stored in the memory to CPU queue 174 or read around the queue. When the P_FlowThrough signal is asserted the control logic 190 directs the data from the memory bus 404 to be read around the memory to CPU queue 174 and on to the CPU data bus 406. When the P_FlowThrough signal is not asserted the data on the memory data bus is stored in the memory to CPU queue 174.

The M_M2PRdy signal indicates to the control logic 190 when data should be latched into the memory-to-CPU queue 174 (if P_FlowThrough is not asserted by the CPU interface 130). The memory-to-CPU queue 174 preferably includes two cache lines 174a and 174b (see Table I) and the data from the memory controller 140 is placed into the cache line and quad word indicated by pointers generated by the control logic 190 and provided to the memory-to-CPU queue 174 via control lines 191. The queue storage and control logic 170 de-queues the data from the memory-to-CPU queue when the CPU interface 130 asserts the P_M2PDQ signal to the control logic 190. The CPU interface may also assert a P_M2PNxLn signal to the control logic 190 to direct the control logic to increment its pointer to the next cache line within the memory to CPU queue 174.

Each cache line 174a, 174b preferably includes four quad words of data wherein each quad word comprises eight bytes. All main memory reads preferably are burst reads of a complete cache line of data from main memory. Any data within the cache line read from main memory that is not needed is simply discarded by the requesting device. One technique for discarding unnecessary data from the memory-to-CPU queue 174 is for the CPU interface 130 to assert the P_M2PNxLn signal to the control logic 190. In response to the assertion of the P_M2NxLn signal, the control logic 190 increments an internal row pointer (which points to one of the rows of cache lines) to effectively flush the unneeded data.

Figure 8:
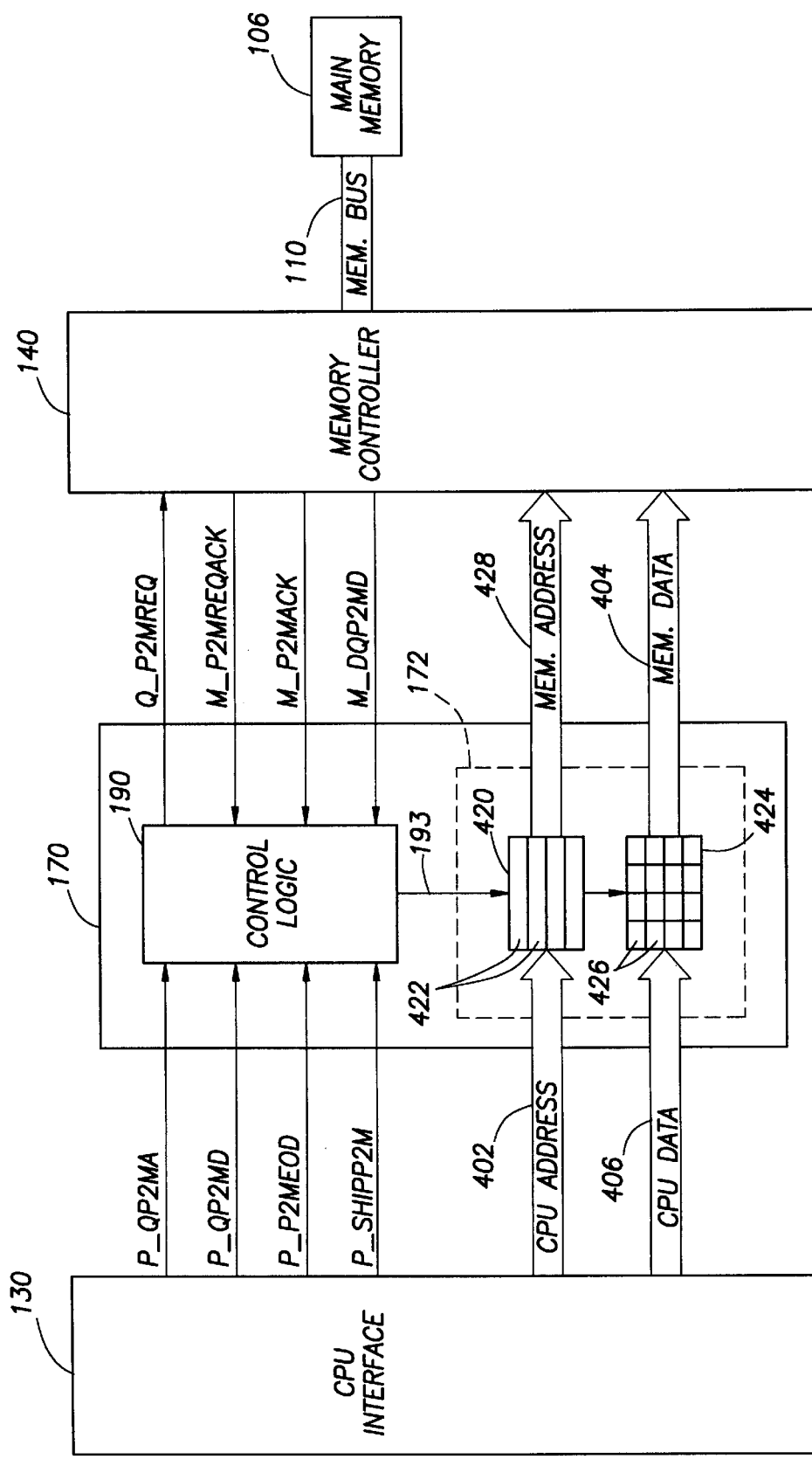
FIG. 8 is a block diagram of an exemplary implementation of a CPU to memory write transaction.

Referring now to FIG. 8, a CPU to memory write cycle is illustrated. The AGP to memory write cycles are piped through the AGP to memory queue 180 in much the same way as CPU to memory writes and thus will be understood to operate in similar fashion as memory write cycles. The CPU interface 130, the memory controller 140, and the queue logic and control 170 are coupled via a number of address and data buses as well as various control signals. Specifically, the queue logic and control 170 preferably couples to the CPU interface 130 via a CPU address bus 402, CPU data bus 406, and at least four control signals including P_QP2MA, P_QP2MD, P_P2MEOD, and P_SHIPP2M. The queue logic and control 170 preferably couples to the memory controller 140 via a memory address bus 402, a memory data bus 404, and at least four control signals including Q_P2MReq, M_P2MReqAck, M_P2Mack, and M_DQP2MD.

The CPU to memory queue 172 includes an address portion or queue 420 and a data portion or queue 424. The address queue 420 preferably is four address locations deep and the data queue preferably is four cache lines deep with each cache line including 4 quad words of storage (see Table I below). Based upon the status of the various control signals, the memory location address associated with the write data is placed on the CPU address bus 402 and stored in one of the address locations 422 comprising the address queue 420. The write data is placed on the CPU data bus 406 by the CPU interface 130 and stored in a cache line 426 of the data queue 424. Pointers generated by the control logic 190 over lines 193 determine the address location 422 and cache line 426 in which write data from the CPU interface 130 is to be placed. It should be understood that in addition to the address itself, other information, such as a valid bit, AGP translated address and chip select decode from the SMAP, are stored in the address queue 420 along with the address.

When the CPU interface 130 decodes a CPU transaction as a write cycle, it preferably asserts the P_QP2MA signal and places the write address on the CPU address bus 402. The P_QP2MA signal indicates to the control logic 190 that it should latch the address on the CPU address bus 402 into the location 422 in the address queue indicated by the pointer from the control logic 190 via lines 193. The CPU interface 130 also asserts the P_QP2MD signal to the control logic 190 which indicates that the control logic should latch in the write data on the CPU data bus 406. The write data is placed in the cache line 426 selected by the control logic pointers. The write data may be all of, or part of, a complete cache line of data. When the last quad word of a transaction is provided to the data queue 424, the CPU interface 130 asserts the P_P2MEOD signal indicating to control logic 190 that no more write data is forthcoming in the present transaction. In response to the assertion of the P_P2MEOD signal, the control logic adjusts its pointers to prepare for the next write transaction by incrementing the row pointer to point to the next cache line in which write data will be placed.

Once all of the write data is supplied to the address and data queues 420, 424, the CPU interface 130 asserts the P_SHIPP2M signal. In response to that signal, the control logic asserts the Q_P2MReq signal to the memory controller 140 indicating that the address and data queues 420, 424 contain write data with associated addresses to be written to main memory 106. When the memory controller 140 determines that the CPU write request has the highest priority among all other pending memory access cycles, if any, the memory controller asserts the M2PReqAck signal to the control logic 190 to inform the control logic that the write cycle will be the next memory cycle run by the memory controller 140. If there are no other addresses stored in the address queue 420, the Q_P2MReq signal is deasserted.

Once the memory cycle is ready to begin, the memory controller 140 asserts the M_P2MAck to the control logic 190. In response, the control logic 190 adjusts its pointers to point to the next address and cache line to be written. The memory controller 140 then initiates the memory write cycle by asserting the appropriate control and address signals to the main memory 106. If the main memory is implemented as synchronous DRAM, for example, the memory controller 140 issues a WRITE command to the memory in accordance with conventional SDRAM operation. At approximately the same time, the memory controller 140 asserts the M_DQP2MD signal to control logic 190. The M_DQP2MD signal directs the control logic to increment its pointers to point to the next quad word of data to be de-queued. The data is de-queued from the data queue 424 a quad word at a time until all of the data associated with the current write cycle is de-queued.

Figure 9:
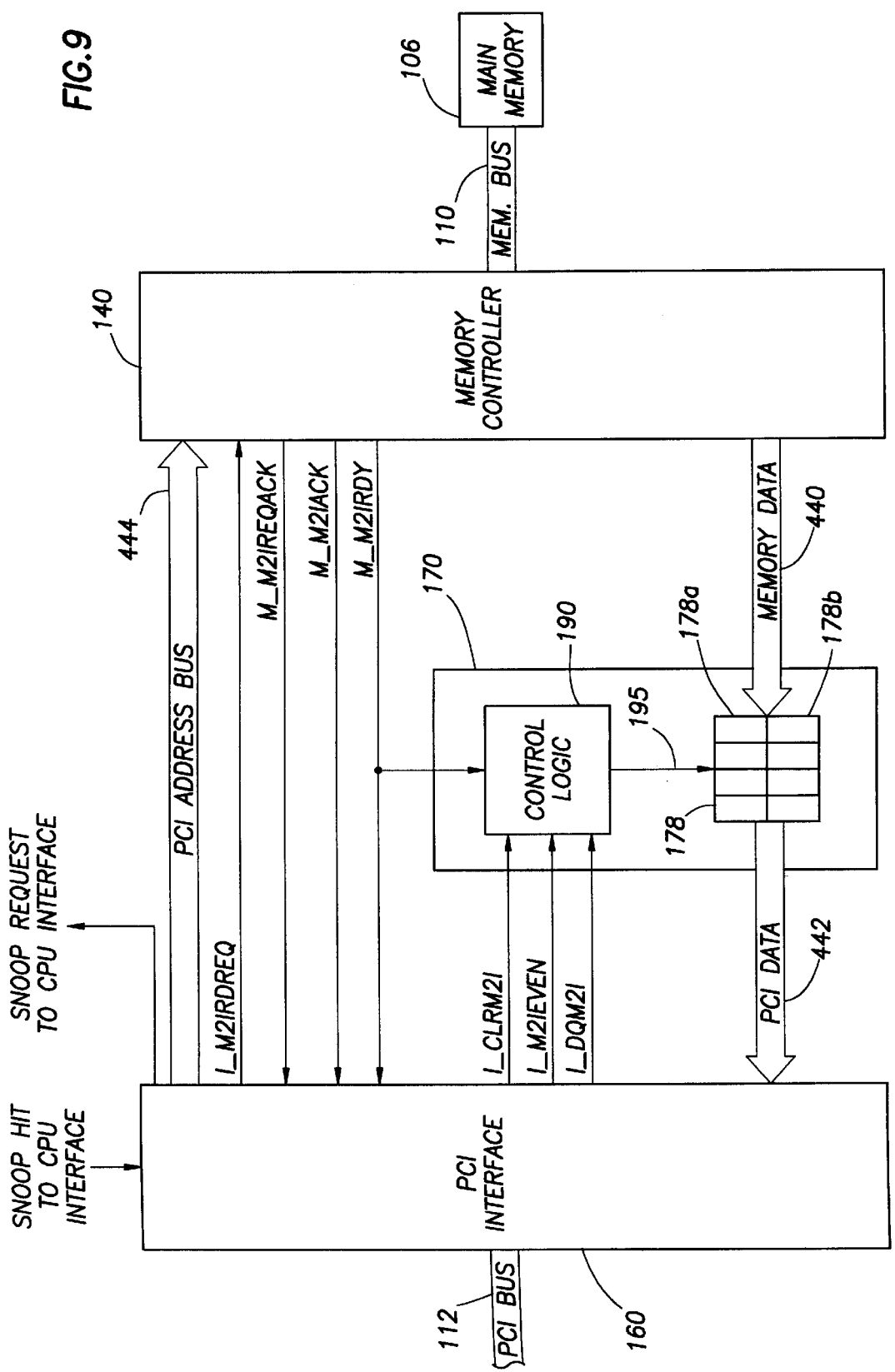
FIG. 9 is a block diagram of an exemplary implementation of a PCI to memory read transaction.

Referring now to FIG. 9, a PCI to memory read cycle is illustrated. The PCI interface 160, the memory controller 140, and the queue logic and control 170 are coupled via PCI address bus 444, data buses 440 and 442, and a number of control signals. The PCI interface 160 couples to the memory controller 140 via memory address bus 444 and the control signals I__M2IRdReq, M__M2IReqAck, M__M2IAck, and M__M2IRdy. The M__M2IRdy signal also is provided as an input signal to the control logic 190 within the queue logic and control 170. Data from main memory 106 is provided from the memory controller 140 to the memory to PCI queue 178 via memory data bus 440. A PCI data bus 442 also couples the PCI interface to the memory to PCI queue 178. The PCI interface 160 also provides I__ClrM2I, ILM2Ieven, and I__DQM2I control signals to the control logic 190.

When the PCI interface 160 decodes a PCI cycle as a memory read, the PCI interface 160 submits a snoop request signal to the CPU interface 130 and asserts the I__M2IRdReq signal to the memory controller 140 indicating that a PCI master device (not shown in FIG. 9) coupled to the PCI bus 112 desires to read data from main memory 106. At substantially the same time, the PCI interface 160 places the address of the memory location from which the data is to be read on the PCI address bus 444. The PCI interface 160 preferably maintains the address on the PCI address bus until the memory controller 140 has latched in the address and indicates it no longer needs for the PCI interface 160 to maintain the address on the PCI address bus.

When the memory controller 140 determines that the PCI read request has the highest priority among any other pending memory access cycles, the memory controller latches in the address from the PCI address bus 444 and asserts the M__M2IReqAck back to the PCI interface 160 to inform the PCI interface that the read request has been accepted and will be the next memory cycle run by the memory controller 140. The PCI interface 160 preferably then de-asserts the I__M2IRdReq signal if no additional data is required from memory. Once the memory cycle is ready to begin, the memory controller 140 asserts the M__M2IAck to the PCI interface 160 as an indication that the PCI interface 160 no longer needs to maintain the address on the PCI address bus 444. The memory controller 140 then initiates the memory read cycle by asserting the appropriate control and address signals to the main memory 106. If the main memory is implemented as synchronous DRAM, for example, the memory controller 140 issues a READ command to the memory in accordance with conventional SDRAM operation.

When the desired data from main memory 106 becomes available to the memory controller 140, the memory controller places the data on the memory data bus 440 and asserts a M__M2IRdy signal to both the PCI interface 160 and control logic 190. The M__M2IRdy signal indicates that the memory controller 140 is ready to transmit the data requested by the PCI master. Preferably, the data is stored temporarily in the memory to PCI queue 178 for subsequent retrieval by the PCI interface 160. The PCI interface 160 can subsequently de-queue the data from the memory to PCI queue 178.

The M__M2IRdy signal indicates to the control logic 190 when data should be latched into the memory-to-PCI queue 178. The memory-to-PCI queue 178 preferably includes two cache lines 178a and 178b with each cache line including 4 quad words (see Table I below) and the data from the memory controller 140 is placed into the cache line indicated by pointers generated by the control logic 190 and provided to the memory-to-PCI queue 178 via control lines 195. The PCI interface 160 preferably asserts the I__ClrM2I signal to the control logic to reset the control logic's pointers on lines 195. The PCI interface 160 can select even quad words from the memory-to-PCI queue 178 by asserting the I__M2Ieven signal, or de-assert I__M2Ieven for the odd quad words. The PCI interface 160 may also totally de-queue the data from the memory to PCI queue 178 by asserting the I__DQM2I signal. In situations in which the PCI interface needs only the second, third, and/or fourth quad word of a cache line, the I__DQM2I signal can be asserted before the data is read in to adjust the pointer from the control logic to the first needed quad word. This operation will effectively flush the unneeded quad words.

If the snoop operation of the current PCI to memory read address results in a snoop hit to a modified cache line condition (i.e., the needed data resides in cache memory and has been modified by a write cycle), the CPU interface 130 asserts a snoop hit signal to the PCI interface 160. In this case, the data requested by the PCI master may be provided from the modified cache line, not from main memory.

Figure 10:
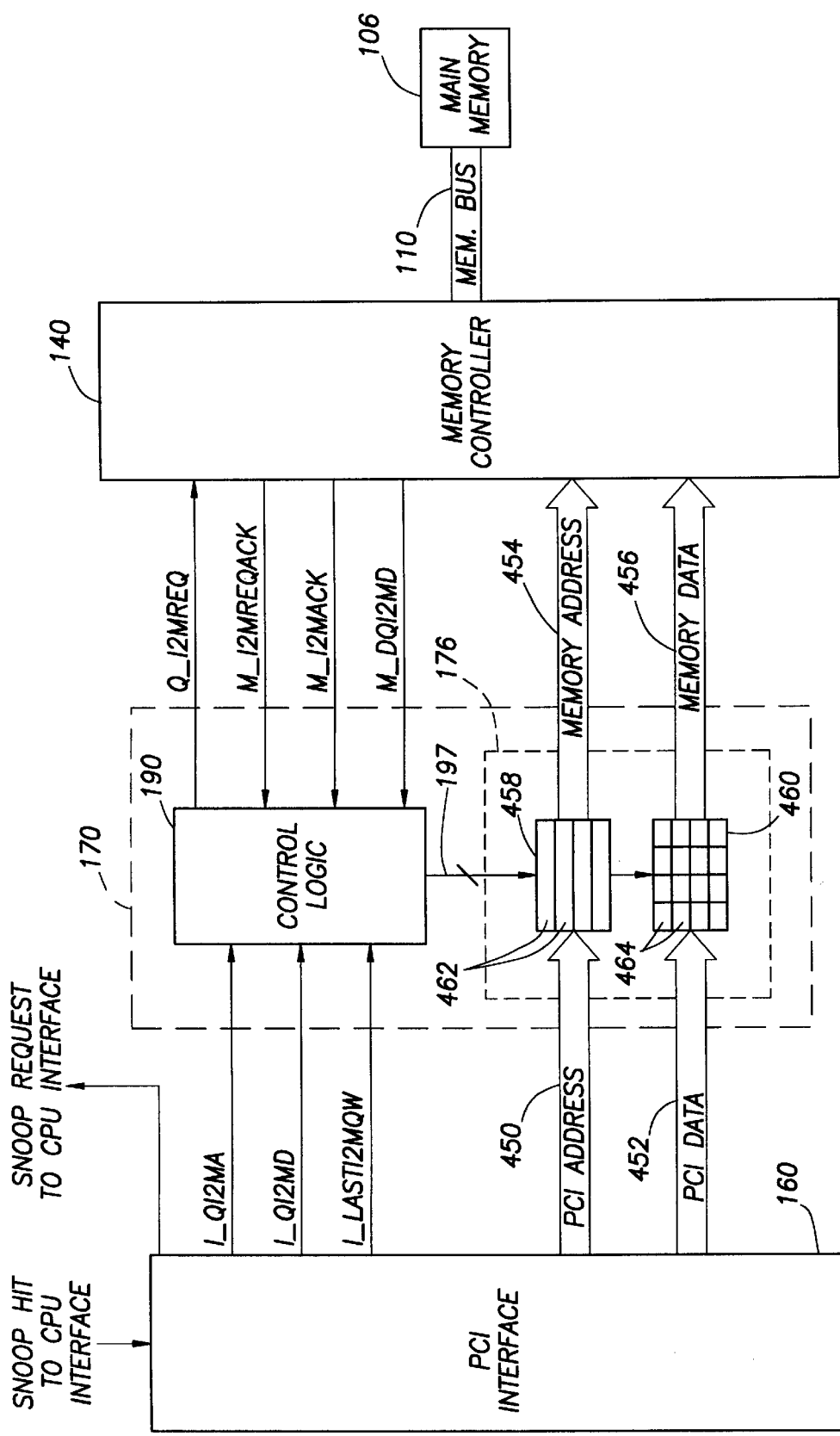
FIG. 10 is a block diagram of an exemplary implementation of a PCI to memory write transaction.

Referring now to FIG. 10, a PCI to memory write cycle is illustrated. The PCI interface 160, the memory controller 140, and the queue logic and control 170 are coupled via a number of address and data buses, as well as various control signals. Specifically, the queue logic and control 170 preferably couples to the PCI interface 160 via a PCI address bus 450, PCI data bus 452, and at least three control signals including I__QI2MA, I__QI2MD, and I__LastI2MQW. The queue logic and control 170 preferably couples to the memory controller 140 via a memory address bus 454, a memory data bus 456, and at least four control signals including Q__I2MReq, M__I2MReqAck, M__I2Mack, and M__DQI2MD.

The PCI-to-memory queue 176 includes an address portion or queue 458 and a data portion or queue 460. The address queue 458 preferably is four address locations deep and the data queue preferably is four cache lines deep (see Table I below), with each cache line including four quad words of data storage. Based upon the status of the various control signals, the memory location address associated with the write data is placed on the PCI address bus 450 and stored in one of the address locations 462 comprising the address queue 458. The write data is placed on the PCI data bus 452 by the PCI interface 160 and stored in a cache line 464 of the data queue 460. Pointers generated by the control logic 190 over control lines 197 determine the address location 462 and cache line 464 in which write data and its corresponding address from the PCI interface 160 is to be placed. It should be understood that other information, such as byte enables are stored in the address and data queues 458, 460 along with the address and data.

When the PCI interface 160 decodes a PCI cycle as a write cycle, it preferably asserts the I__QI2MA signal and places the write address on the PCI address bus 450. The I__QI2MA signal indicates to control logic 190 that it should latch the address on the PCI address bus 450 into the location 462 in the address queue indicated by the pointer value on lines 197. The PCI interface 160 also asserts the I__QI2MD signal to the control logic 190 which indicates that the control logic should latch in the write data from the PCI data bus 452. The write data is placed in the cache line 464 selected by the control logic pointers. The write data may be all of, or part of, a complete cache line of data. When the last quad word of a transaction is provided to the data queue 424, the PCI interface 160 asserts the I_LastI2MQW signal indicating to control logic 190 that no more write data is forthcoming in the present transaction. In response to the assertion of the I_LastI2MQW signal, the control logic 190 adjusts its pointer value on control lines 197 to prepare for the next write transaction by incrementing the row pointer to point to the next cache line in which write data will be placed.

Referring still to FIG. 10, once all of the write data is supplied to the address and data queues 458, 460, the control logic 190 asserts the Q_I2MReq signal to the memory controller 140 indicating that the address and data queues 458, 460 contain write data with associated addresses to be written to main memory 106. When the memory controller 140 determines that the PCI to memory write request has the highest priority among any other pending memory access cycles, the memory controller asserts the M_I2MReqAck signal to the control logic 190 to inform the control logic that the write cycle will be the next memory cycle run by the memory controller 140. If no other addresses are stored in the address queue 420, the Q_I2MReq signal is deasserted.

Once the memory cycle is ready to begin, the memory controller 140 asserts the M_I2MAck signal to the control logic 190. In response, the control logic 190 adjusts its pointer value on control lines 197 to point to the next address and cache line to be written. The memory controller 140 then initiates the memory write cycle by asserting the appropriate control and address signals to the main memory 106. If the main memory 106 is implemented as synchronous DRAM, for example, the memory controller 140 issues a WRITE command to the memory in accordance with conventional SDRAM operation.

At approximately the same time, the memory controller 140 asserts the M_DQI2MD signal to the control logic 190. The M_DQI2MD signal directs the control logic 190 to increment its pointer value to point to the next quad word of data to be de-queued. The data is de-queued from the data queue 460 to the PCI interface 160 a quad word at a time until all of the data associated with the current write cycle is de-queued.

Before beginning the PCI-to-memory write cycle, the PCI interface 160 asserts a snoop request signal to the CPU interface 130. If the snoop operation of the current PCI-to-memory write address results in a snoop hit condition (i.e., the data to be written already resides in cache memory), the CPU interface 130 asserts a snoop hit signal to the PCI interface 160. Alternatively, the PCI write data may be written to main memory 106 if the computer's cache memory, for example, is implemented as a write through cache, as would be understood by one of ordinary skill in the art. In this case, that data in cache memory must be written to main memory before the PCI data is written to memory. Thus, the Q_P2MReq signal (FIG. 8) must be asserted before the Q_I2Mreq signal is asserted.

Figure 11:
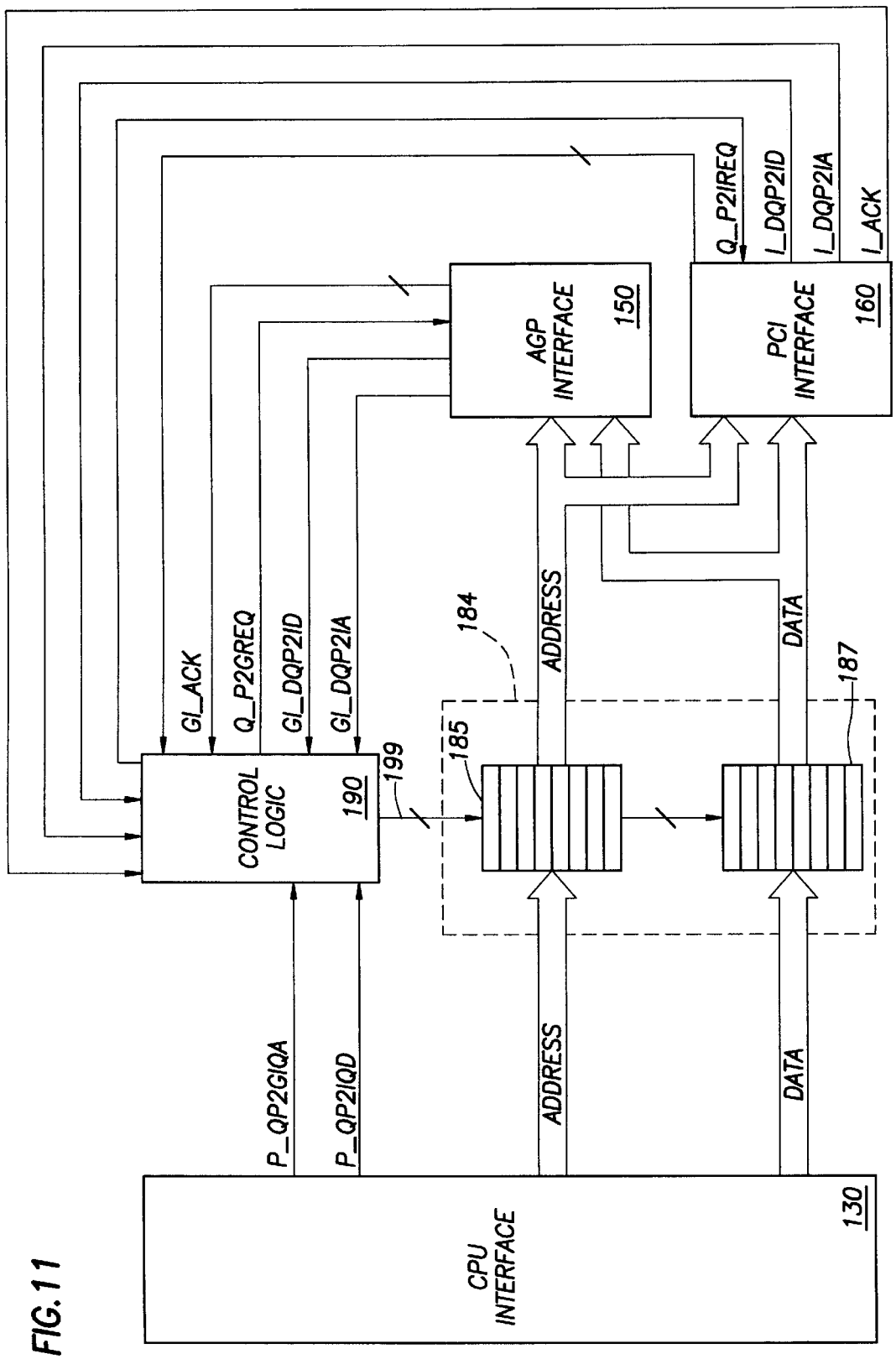
FIG. 11 is a block diagram of an exemplary implementation of a CPU to PCI/GCI write transaction.

Referring now to FIG. 11, a block diagram for a CPU to PCI/AGP data transaction is illustrated. Because the AGP bus can be operated as a conventional PCI bus, both the PCI interface 160 and the AGP interface 150 use the same queue (CPU to PCI/GCI 184) for CPU to PCI/AGP write transactions. As used in this disclosure, the term "GCI" refers to an AGP related transaction executed following the PCI bus protocol.

The methodology for a CPU to PCI/AGP write cycle is similar to the write cycles between the CPU, AGP, and PCI interfaces 130, 150, 160 and the memory controller 140. CPU-to-PCI/AGP queue 184 includes an address queue 185 and a data queue 187. When the CPU interface 130 decodes a transaction as a CPU to PCI/GCI write cycle, the address and data information are posted to address queue 185 and data queue 187, respectively, upon assertion of the P_LoadP2GI, and P_QPGIQA control signals.

Once the write data and address are posted to the queue 184, the control logic 190 asserts a Q_P2GReq or Q_P2IReq signal to the AGP or PCI interfaces depending on whether the write cycle is targeted to the APG or PCI interface. The interface that receives the request signal responds by asserting an acknowledge signal (GI_Ack or I_Ack) to acknowledge receipt of the write request signal. The targeted interface then asserts data and address de-queueing signals (GI_DQP2ID and GI_DQP2IA for the AGP interface and I_DQP2ID and I_DQP2IA for the PCI interface). In response to these signals, the control logic 190 causes the address and data information to be de-queued from the address and data queues 185, 187.

Figure 12:
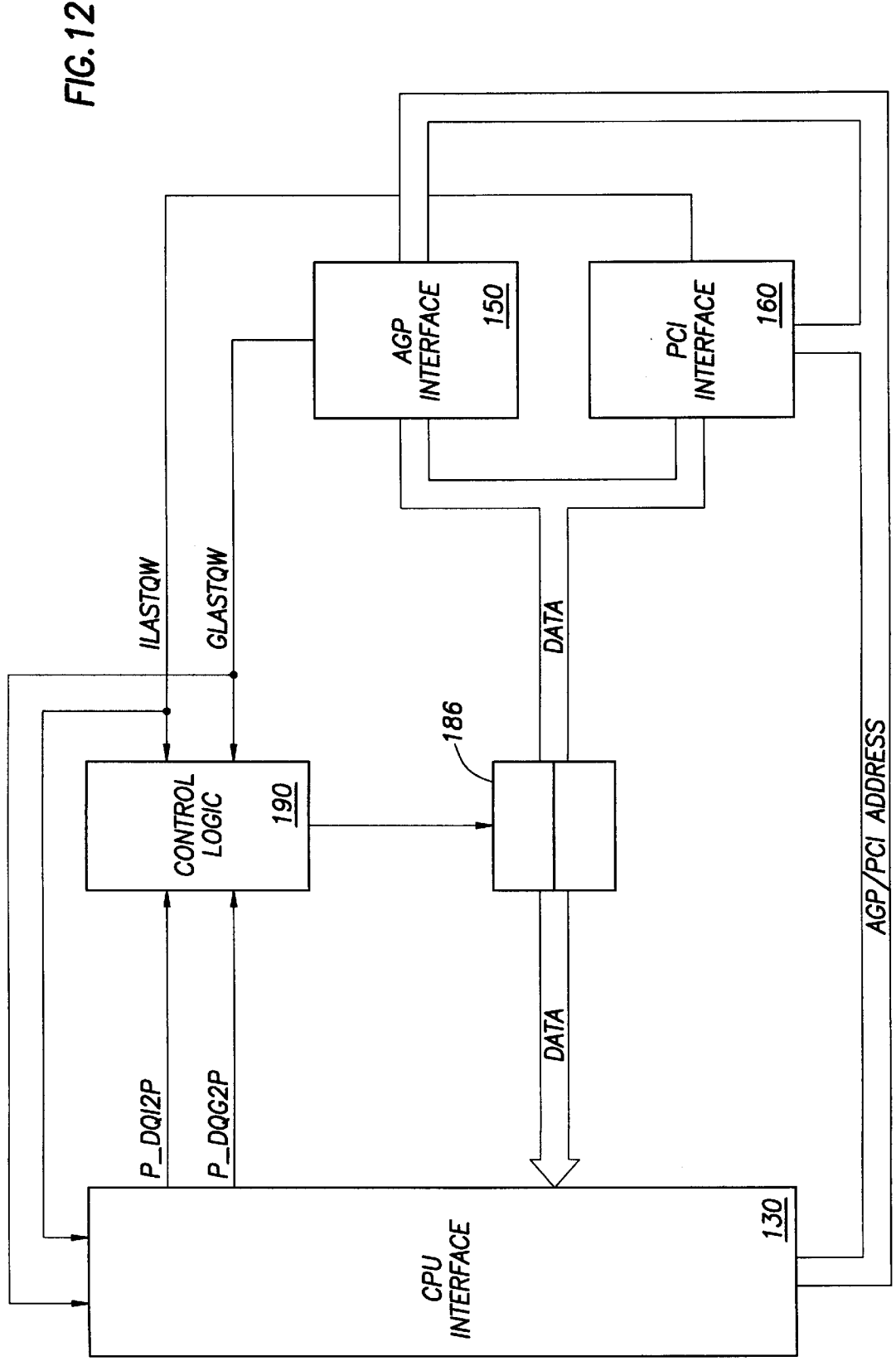
FIG. 12 is a block diagram of an exemplary implementation of a CPU to AGP/PCI read transaction.

In FIG. 12, an exemplary block diagram illustrates a CPU to PCI/AGP read transaction in which data from either the APG interface 150 or PCI interface 160 is temporarily stored in the PCI/APG to CPU queue 186. The PCI/AGP to CPU queue 186 is controlled by control signals from control logic 190. These read cycles are different than read cycles between other interfaces. In the case of CPU reads from PCI/AGP, the address to be read is placed in the address queue 185 (FIG. 11). This is done because the address and data queues 185, 187 (FIG. 11) need to be flushed before the CPU read of PCI or AGP can occur. Because an address location is being used for the read cycle, the data queue 187 will have a placeholder in the queue to keep the address and data queues in synch.

The data being returned to the CPU is queued into the PCI/AGP-to-CPU queue 186, which the CPU interface 130 reads it out. When the last quad word of data is loaded into the queue 186, the PCI (on AGP) interface asserts and ILastQW (or GLastQW in the case of an AGP read) to indicate to the CPU interface 130 to read the data. The CPU interface 130 reads the data out of queue 186 by asserting either a P_DQI2P signal for a PCI read or a P_DQG2P signal for an AGP read.

Transactions between the PCI bus 112 and AGP bus 114 proceed according to the principles described above. The PCI-to-AGP queue 188 (FIG. 2) preferably includes an 8 slot address queue and an 8 quad word data queue. Further details of PCI to AGP transactions have been omitted for sake of clarity.

The read and write cycles described above with reference to FIGS. 7–12 represent one way to effectuate the flow of data from one interface to another (including the memory controller) using queues for temporarily storing the information. One of ordinary skill in the art will recognize other implementations to accomplish the flow of data between the interfaces and memory controller and the scope of the invention is intended to include any possible technique now known or later developed.

Table I below identifies the preferable size of the queue storage elements 172–188 shown in FIGS. 7–12. It should be understood however that queue storage elements with different sizes than those listed in Table I can also be implemented in computer system 100.

TABLE I
QUEUE STORAGE ELEMENT SIZES

| QUEUE NAME | DATA or ADDRESS | NUMBER of LOCATIONS | SOURCE | DESTINATION |
|---|---|---|---|---|
| CPU to memory addr 420 | Address | 4 slots | Processor | Memory |
| CPU memory data 424 | Data | 4 cachelines | Processor | Memory |
| CPU to PCI/GCI addr 185 | Address | 8 slots | Processor | PCI or GCI |
| CPU to PCI/GCI data 187 | Data | 8 quadwords | Processor | PCI or GCI |
| Memory to CPU 174 | Data | 2 cachelines | Memory | Processor |
| PCI/AGP to CPU 186 | Data | 2 cachelines | PCI or GCI | Processor |
| PCI to memory addr 458 | Address | 4 slots | PCI | Memory |
| PCI to memory data 460 | Data | 4 cachelines | PCI | Memory |
| Memory to PCI 178 | Data | 2 cachelines | Memory | PCI |
| Memory to AGP 182 | Data | 8 cachelines | Memory | AGP |
| Memory to GCI | Data | 2 cachelines | Memory | GCI |
| AGP/GCI to memory data | Data | 8 cachelines | GCI or AGP | Memory |
| AGP/GCI to memory address | Address | 8 slots | GCI or AGP | Memory |
| PCI to GCI addr | Address | 8 slots | PCI | GCI |
| PCI to GCI data | Data | 8 quadwords | PCI | GCI |
| Read Modify Write | Data | 1 cacheline | Memory and PCI, GCI, or Processor | Memory |

In accordance with a preferred embodiment of the invention, the bridge logic unit 104 generally improves overall system performance by requiring certain bus transactions to occur before other transactions. The particular priority or ordering scheme implemented in bridge logic unit 104 can be any suitable scheme and generally will be determined through a performance analysis. Accordingly, for one embodiment of computer system 100 refresh cycles are given highest priority. Further, CPU to memory cycles are generally given higher priority than PCI to memory cycles.

Regardless of the particular ordering scheme implemented, certain problematic conditions may occur in which bus transactions with lower priority are not allowed to complete because higher priority transactions are pending. By way of example, PCI read requests may be "starved" for memory access (i.e., needs access to memory but can not get it) because of the higher priority that may be given to posted CPU to memory write cycles. In general, a bridge logic unit 104 which allows some or all of bus transactions to pass through the bridge concurrently may cause situations in which a device coupled to either the CPU bus 108, PCI bus 112, or AGP bus 114 cannot complete transactions because of other pending bus activity through the bridge logic unit 104. Situations in which a transaction becomes stalled due to other bus activity result from the rules dictated by the specifications associated with each external bus (CPU bus 108, PCI bus 112, AGP bus 114). The following discussion summarizes some of the significant rules required by the Pentium Pro processor, PCI, and AGP specifications to which the bridge logic unit 104 preferably complies, as well as the manner in which the bridge logic unit responds when an inconsistent situation arises. It should be recognized that if different bus standards are implemented in computer system 100, the following rules may be different and the rules to which the bridge logic unit 104 adheres may also be different.

If the CPU 102 comprises a processor from the Pentium® Pro family of processors, the following rules for write-back cacheable memory regions must be followed by devices coupled to the CPU bus 108:

1. Read cycles may be carried out speculatively (i.e., not contingent on a previous cycle completing) and in any order.
2. Read cycles can pass buffered write cycles, but the CPU guarantees correctness if the write is to the same location as the read.
3. Write cycles to memory are always carried in program order (i.e., the order in which the software initiates write cycles).
4. Write cycles can be buffered.
5. Write cycles are not performed speculatively.
6. Data writes can be forwarded within the processor.
7. Read or write cycles can not pass input/output (I/O) instructions, locked instructions, or serializing instructions.

For non-cacheable memory, transactions on the CPU bus 108 must follow a strong ordering model for memory accesses, I/O accesses, locked memory accesses, and PCI configuration accesses. Strong ordering of transactions means that the transactions are completed on the CPU bus 108 in the order in which they were initiated. If additional explanation of the ordering rules identified above for the Pentium® Pro bus is desired, reference may be made to the *Pentium Pro Family Developer's Manual, Volume 3: Operating System Writer's Manual.*

The PCI bus 112 requires support for a write-results ordering model that follows a producer-consumer model. For this model, the results of write cycles initiated by one PCI master (the producer) anywhere in the computer system are observable by another master (the consumer) anywhere in the system only in the original order of the write cycles. Further, memory write cycles and memory write and invalidate commands may be posted on the PCI bus 112 (i.e., stored in a temporary buffer or queue) for subsequent execution. Memory read cycles, I/O read cycles, and configuration cycles cannot be posted on the PCI bus 112. In compliance with the *PCI Local Bus Specification Revision* 2.1, the bridge logic unit 104 must adhere to the following ordering rules:

1. Memory writes posted in the PCI bus 112 and moving in the same direction will complete on the destination bus in the same order they complete on the originating bus;
2. Writes flowing in one direction have no ordering requirements with respect to writes flowing in the other direction on the PCI bus 112;
3. Posted memory write buffers in both directions on the PCI bus must be flushed before completing a read in either direction. A read transaction must push ahead of it any posted writes originating on the same side of the bridge and posted before the read. Further, before the read can complete on its originating bus, it must pull out of the bridge any posted writes that originated on the opposite side and were posted before the read command completes on the destination bus;
4. A device should not make the acceptance of a memory write transaction as a target contingent on the prior completion of a transaction as a master (e.g., to avoid deadlocks);
5. Interrupts are not synchronizing events, and device drivers cannot depend on interrupts to flush buffers. Interrupt acknowledge cycles are not guaranteed to appear;
6. Host bus bridges (e.g., bridge logic unit 104) may post I/O writes when they follow the ordering rules in the PCI specification and do not cause deadlock.

All other bridges (e.g., secondary bridge logic unit 122, FIG. 1) in the system must not post I/O writes;

7. For a device driver to guarantee that a write has completed at a target device, the driver must complete a read to the write targeted device; and
8. A host bridge (e.g., bridge logic unit 104) must push all posted memory writes before attempting a lock on the secondary bus. Once lock has been established on the secondary interface, the bridge cannot accept any posted write data moving toward the primary interface until the LOCK signal has been de-asserted.

The *PCI Specification Revision* 2.1 may be consulted if further explanation of these ordering rules is desired.

The producers and consumers may include the CPU and a PCI or AGP bus master, as well as devices coupled to the known 1394 and universal serial bus ("USB") interfaces. The possible locations for storing flags include main memory 106, a PCI slave device, and an AGP slave device.

The AGP bus includes two types of cycles: AGP cycles and PCI cycles. The AGP cycles are divided into low-priority and high-priority requests. The rules for low-priority AGP cycles that must be followed by devices coupled to an AGP bus include:

1. There is no ordering relationship between an AGP operation and a PCI transaction;
2. The AGP target device returns AGP read data in the order requested on the AGP bus 114 itself Read requests may be executed to memory in any order;
3. AGP writes are run on the AGP bus 114 and processed by the target device in the order requested;
4. AGP read data returned must be coherent with previously issued AGP writes. That is, AGP reads push previously issued writes;
5. AGP writes may bypass previously issued AGP reads. AGP read data may contain data from a subsequently issued AGP write;
6. A FLUSH command forces writes to be visible to the rest of the system.
7. A FENCE command forces writes to not pass previously queued reads. High-priority AGP cycles should follow these rules:
    1. There is no ordering relationship between a high-priority AGP operation and either a low-priority AGP operation or a PCI transaction.
    2. There are no ordering requirements between high-priority reads and high-priority writes.
    3. High-priority reads must run on the AGP bus in order with other high-priority reads.
    4. High-priority writes must run on the bus in order with other high-priority writes.
    5. A FLUSH command forces high-priority writes to be visible to the rest of the computer system. PCI transactions initiated by an AGP compliant device must follow the PCI ordering rules.

The bridge logic unit 104 preferably supports both upstream (from PCI to memory) and downstream (CPU to Memory or PCI) locked cycles in which bus cycles are completed without interruption. Upstream locks (from PCI to memory) are honored if the CPU 102 does not have an active downstream locked cycle. Downstream locks from the CPU 102 to main memory 106 or the PCI bus 112 are honored when the PCI bus does not have an active upstream lock to main memory 106. In the case where both the CPU 102 and a PCI device are trying to issue a lock within the same time slice, the CPU 102 preferably wins the arbitration for locking. The CPU 102 locks to memory 106 permit PCI and GCI write cycles to post to the PCI to memory queue 176 and the AGP to memory queue 180, respectively, but the snooping of write requests preferably ceases until the CPU lock completes. This will stall all writes to memory from the PCI or AGP interfaces. Further, read cycles from the PCI and AGP interfaces 150, 160 will not be permitted to complete until the CPU lock signal is de-asserted. CPU locks to PCI will arbitrate for lock according to the *PCI Specification Revision* 2.1. Lock is not supported on the AGP/GCI bus. PCI locks to memory preferably hold off all CPU to memory traffic until the completion of the PCI lock.

The Pentium® Pro processor generally guarantees that the following memory operations are carried out atomically (i.e., without interruption by another cycle):

1. Reading or writing a byte;
2. Reading or writing a word aligned on a 16-bit boundary;
3. Reading or writing a double word aligned on a 32-bit boundary;
4. Reading or writing a quad word aligned on a 64-bit boundary;
5. 16-bit accesses to uncached memory locations that fit within a 32-bit data bus; and
6. 16-, 32-, and 64-bit accesses to cached memory that fit within a 32-byte cache line.

For non-Pentium® Pro processors, software should assume that only the following memory accesses are guaranteed to be handled atomically:

1. 8-bit accesses on any boundary;
2. 16-bit accesses on a 16-bit boundary; and
3. 32-bit accesses on a 32-bit boundary.

Based on the rules 1–3 above, it should be sufficient for atomicity purposes to only use PCI lock when CPU lock is used, and not use PCI lock when unlocked cycles need to be run as two cycles because of bus size difference. However, creating locked cycles out of read requests removes a deadlock condition. For example, if two read requests pass through a PCI to PCI bridge device, the second read may be retried. The PCI to PCI bridge is free to fill its upstream write buffer with new data. When the second read is attempted again, the upstream buffer in the PCI to PCI bridge must be flushed. However, the CPU bus is busy waiting for read data, so the bridge logic unit 104 cannot run snoop cycles for the writes (which it must accept). If the reads are locked together, the bridge is prohibited from accepting new upstream data until the lock is cleared. This solves the problem for both memory and I/O reads.

Posted memory writes are not a problem; the CPU bus is free for snooping, even though the bridge logic unit 104 is busy trying to complete the write. Non-posted memory writes are a problem. In the bridge logic unit 104, posting may be disabled for a few regions of memory defined by the GAP and PAM registers. For those memory regions, cycles preferably are posted to a one row queue, thereby avoiding deadlock conditions from occurring.

The preceding rules are derived from the specifications for the Pentium® Pro CPU bus, the PCI bus, and the AGP bus. The bridge logic unit 104 preferably enforces these rules by following a preferred set of rules. The rules followed by the bridge logic unit 104 can be varied depending on the whether the software running in the computer system supports a strongly ordered system or a weakly ordered system. In a strongly ordered system, the hardware (including the bridge logic unit 104) must guarantee proper bus transaction order. By contrast, a weakly ordered system requires the software to ensure that the bus transactions occur in the proper order. A weakly ordered system generally is implemented by requiring the software to read the last data written before changing a status flag indicating that the software has written the data. The bridge logic unit 104 can be used with either a strongly ordered or a weakly ordered system. Whether the bridge logic unit 104 is to support strong ordering or weak ordering is programmable through a configuration register. The bridge logic unit preferably defaults to weakly ordered configuration upon system start up or reset.

The rules adhered to by the bridge logic unit 104 in complying with the preceding CPU, PCI, and AGP bus rules are described below with reference to FIGS. 1 and 2. First, PCI bus 112 traffic in which the bridge logic unit 104 represents a PCI slave is discussed. In a strongly ordered system the bridge logic unit 104 retries a PCI read transaction when posted write data from the CPU 102 must be flushed (written) to the PCI bus 112 as described above. Retrying a PCI read transaction effectively postpones the read transaction until the posted writes to the PCI interface 160 complete. This bridge logic unit 104 rule results from the PCI ordering rules that require all posted write data to be flushed before completing a read transaction.

In a weakly ordered system, however, the bridge logic unit 104 acting as a PCI slave does not retry a read transaction when a PCI master read occurs and posted write data from the CPU needs to be flushed to the PCI bus. Instead, software should guarantee correct operation by reading the last location written before setting a status flag in main memory 106 thereby allowing a read of the previously written data.

Irrespective of whether the bridge logic unit 104 is configured to operate in a strongly or weakly ordered system, the PCI interface 160 should cease posting PCI to memory write cycles from a PCI master to the PCI to memory queue 176 when a CPU 102 read from PCI bus 112 is pending and there are posted writes from a PCI master pending in the PCI to memory queue 176 (FIG. 2). To effectuate the no post condition, all future attempts by the PCI master to write to main memory 106 preferably are retried until the pending CPU read from the PCI bus is initiated on the PCI bus. Alternatively, the retry condition will clear when the PCI to memory queue 176 empties and a no post count value (which is part of a programmable register in the SMAP) equals zero. Other techniques to effectuate no posting of cycles in the bridge logic unit 104 may also be used. The no post count value insures that the retried PCI write is permitted to complete in the event the CPU read cycle that caused the retry condition does not complete. The CPU interface 130 preferably asserts a CPU to PCI no post signal (not shown) to the PCI interface 160. The PCI interface 160 preferably responds by retrying the PCI write cycle. This rule ensures that the CPU 102 is not starved from reading PCI while multiple PCI posted memory writes to main memory 106 are occurring.

A PCI retry also occurs, irrespective of the bridge logic unit 104 being configured in a weakly or strongly ordered system, when a CPU locked request is pending and the PCI to memory queue 176 is not empty. The PCI interface 160 should not accept posted write data targeted for main memory 106 until the CPU lock request is accepted or the PCI to memory queue 176 has emptied and a no post count value (programmable in the SMAP) equals zero.

In certain situations, CPU-to-PCI write posting is disabled. This means that no CPU-to-PCI write requests should be stored in a write queue. One situation in which CPU-to-PCI write posting is disabled is when a PCI master asserts the FlushReq signal which indicates that cycles desire to be issued that cannot be retried (such as a cycle originated by an ISA device). In this case, all posting buffers are emptied ("flushed") and a MEMACKL signal is issued by the bridge 104 to signal a ready state for the transfer of the non-retry cycles. A CPU to PCI no post signal (I_P2INoPost) signal is asserted and a programmable timer value is counted down once the initial no post condition is satisfied.

Another situation in which CPU-to-PCI write posting is disabled is in a strongly ordered system and a PCI master read cycle to memory is retried because the CPU to PCI queue 184 is not empty. In this case, the I_P2INoPost signal is asserted and a programmable timer value is counted down once the initial no post condition is satisfied.

CPU to memory write posting preferably is disabled when one of three conditions occur with respect to the PCI bus. In these situations, the CPU interface 130 enters a no post condition upon assertion of the I_P2MNoPost signal by the PCI interface 160. First, CPU to memory write posting is disabled when the PCI to memory queue 176 is full. This condition indicates that all future PCI to memory write cycles must be retried until space is made available in the PCI to memory queue 176. This CPU to memory no posting condition remains active until the initial condition clears (i.e., the PCI to memory queue 176 is not full) and the CPU to memory no post counter (preferably a programmable register) has expired.

Second, CPU to memory write posting also is disabled when the PCI to memory queue 176 or the CPU to memory queue 172 has write posted data, an outstanding PCI read request has its latency counter expire, and a read request acknowledge from the PCI interface 160 was never received by the PCI device generating the read request. Disabling CPU to memory write posting in this situation prevents a possible PCI read starvation condition in which a PCI master can not read memory because of other current and pending memory cycles. This write posting disable condition remains active until a PCI read request has been accepted by the memory controller 140 and the CPU to memory no post counter has expired. The memory controller accepts a read PCI request by asserting the M_M2IReqAck signal (FIG. 9).

The third situation in which CPU to memory write posting is disabled is when a PCI master has issued a read request to memory to the same memory address as for a posted PCI to memory write (posted in the PCI to memory queue 176). This condition in which a PCI device is trying to read and write to the same memory address can be determined by implementing the PCI to memory write queue 176 as content addressable memory ("CAM") known to those of ordinary skill in the art. The CPU to memory no posting condition preferably remains active until the PCI read and write to the same memory address condition (also referred to as a CAM "hit") clears and the CPU to memory no post counter has expired.

With respect now to GCI bus traffic (AGP cycles implemented as PCI cycles), the bridge logic unit 104, acting as a GCI slave in a strongly ordered system, preferably retries when a GCI master read occurs and posted write data from the CPU 102 needs to flushed to the AGP bus. This bridge logic unit 104 rule is implemented because of the GCI transaction ordering rules require that all posted write data be flushed before completing a read transaction.

In a weakly ordered system, the bridge logic unit 104 acting as a GCI slave does not retry when a GCI master read occurs and posted write data from the CPU 102 needs to be flushed to the AGP bus. Software instead preferably guarantees correct operation by reading the last location written before setting a status flag in memory allowing the written data to be accessed.

Regardless of whether the bridge logic unit 104 is configured for strongly or weakly ordered operation, GCI retry occurs in two situations. First, GCI retry occurs when a CPU read from GCI is pending and there are posted writes in the AGP to memory queue 180. Any future attempts by the GCI master to write to main memory will be retried until the pending CPU read from GCI is initiated on the GCI bus or the AGP to memory queue 180 empties and a no post count value (which preferably is included as a programmable register in the SMAP) expires. This GCI retry rule is implemented to ensure that the CPU is not starved from reading GCI while multiple GCI posted writes to main memory 106 are occurring.

Second, GCI retry also occurs, irrespective of the bridge logic unit 104 being configured for strongly ordered or weakly ordered operation, when a CPU locked request is pending and the AGP to memory queue 180 is not empty. The AGP interface 150 preferably does not accept posted write data targeted for main memory 106 until the CPU lock request is accepted or the AGP to memory queue 180 has emptied and no post count value (programmable in SMAP) expires.

GCI write posting preferably is disabled when the bridge logic unit 104 is configured for strongly ordered operation and a GCI master read cycle to memory is retried because the CPU to PCI/AGP queue 184 is not empty. In this case, a CPU to GCI no post signal (G_P2INoPost) is asserted and a programmable timer value is counted down once the initial no post condition is satisfied.

In addition to the conditions described above as to when CPU to memory write posting is disabled relative to PCI transactions, CPU to memory write posting may also be disabled when one of two GCI-related conditions occurs. In these two situations, the CPU interface 130 enters a no post condition upon assertion of the G_P2MNoPody signal by the AGP interface 150. The first condition is when the AGP to memory queue 180 is full. This condition indicates that all future GCI write cycles must be retried until space is made available in the AGP to memory queue 180. This condition will stay active until the initial condition clears (i.e., the AGP to memory queue 180 is no longer full) and the CPU to memory no post programmable counter has expired.

Secondly, CPU to memory write posting is disabled when a GCI read cycle is to the same memory address as a posted GCI write cycle. This condition may be determined by implementing the AGP to memory write queue 180 as a CAM as described above with respect to the PCI to memory write queue 176. Disabling CPU to memory write posting when a GCI CAM hit condition is present remains active until the CAM hit condition clears and the CPU to memory no post counter expires.

In certain situations, the PCI and AGP interfaces may need to stop posting write cycles to memory through the I2MQ 176 and G2MQ 180. Accordingly, the PCI interface 160 and the AGP interface 150 each include a no post signal internal to each interface 150, 160 (an I2MNOPOST signal in the PCI interface and a GI2MNOPOST signal in the AGP interface). These particular no post signals are asserted internally in the interface's logic to prevent the interface from posting additional write cycles to memory through the associated write queues 176 or 180.

Referring to FIGS. 1 and 2, the situations in which the PCI interface 160 should place itself into a no post to memory condition are as follows:

(1) The CPU 102 wants to run a read cycle to the PCI bus 112, but the I2MQ is not empty;

(2) The CPU has established a "lock" on the PCI bus during a read cycle and the PCI bus enters an idle state before the CPU can complete the locked sequence. A locked sequence on the PCI is a well-known sequence in which the CPU, for example, reads from PCI, processes the data read, and then wishes to write the data back to the same PCI address. Locking the address prevents other devices from reading the data before the CPU has a chance to write the new data back to the address; and (3) An I/O read cycle runs on the PCI bus crosses a double word boundary (thus requiring a two-phase read cycle to read all of the data) and the read cycle gets disconnected, for any one of a variety of reasons, after the first double word is transferred but before the rest of the data is transferred.

In these cases, and any other desired case, the PCI interface internally will assert its I2MNOPOST signal and cease posting write cycles to memory until the situation resolves itself. The AGP interface 150 no posts itself for the same reasons described above, but with respect to the AGP bus instead of the PCI bus.

In another aspect of the invention, the bridge device 104 may need to abort a transaction cycle. For example, in the following cases there is a non-deferred cycle in the P2IQ 184 (FIG. 2) or I2PQ 186:

(1) A snoop request from the PCI interface 160 or AGP interface 150 is received by the processor interface. A CPU cycle is retried to avoid a deadlock;

(2) The cycle after the non-deferred read is a read or a write from main memory 106 and the data is ready to be sent to the requesting device. The CPU 102 is retried to avoid slowing down the read or write cycle; and (3) A deferred CPU read has completed and the CPU interface 130 is ready to ship the data back to the CPU 102. Again, the CPU 102 is retried to get the data back to the CPU.

The PCI interface 160 and the AGP interface 150 also can request a CPU cycle abort. This occurs when the CPU requests a non-deferred read or write and the cycle is retried on the PCI (or AGP) bus. The PCI interface 160, or AGP interface 150, will have the CPU 102 retried because it does not know when (if ever) it can run the cycle successfully. Thus, the PCI interface 160 lets the CPU 102 decide what to do.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a CPU;
   a memory device;
   a graphics bus;
   an expansion bus;
   an interface apparatus coupling said CPU, said memory device, said graphics bus and said expansion bus, said interface apparatus including:
      a CPU interface;
      a graphics bus interface;
      an expansion bus interface;
      a memory controller; and
      a queue storage and control logic unit coupling said CPU interface, said graphics bus interface, said expansion bus interface, and said memory controller, said queue storage and control logic capable of transferring data between said CPU interface and said memory controller while concurrently transferring data between said expansion bus interface and said graphics bus interface; and
      an input device operatively coupled to said interface apparatus.

2. A computer system, comprising:
   a CPU;
   a memory device;
   a graphics bus;
   an interface apparatus coupled between said CPU and said memory device, said interface apparatus including:
      a CPU interface;
      a graphics bus interface;
      a memory controller; and
      a queue storage and control logic unit coupling said CPU interface, said graphics bus interface, and said memory controller, said queue storage and control logic including a CPU-to-memory queue for temporarily storing CPU-to-memory write requests, a memory to CPU queue for temporarily storing read data from said memory device, and control logic coupled to said CPU-to-memory and said memory to CPU queues, and said CPU-to-memory write requests and said read data stored concurrently in said CPU-to-memory and said memory-to-CPU queues;
   an input device operatively coupled to said interface apparatus; and
   wherein said queue storage and control logic includes a first queue storage element and a second queue storage element, said first and said second queue storage element coupling said CPU interface to said graphics bus interface, and said control logic couples to said first and second queue storage element.

3. A computer system as in claim 2 wherein said queue storage and control logic further includes a third and a fourth queue storage element coupling said memory controller to said graphics bus interface, and said control logic couples to said third and fourth queue storage elements.

4. A computer system as in claim 3 wherein said first queue storage element temporarily stores transactions passing from said CPU interface to said graphics bus interface and said second queue storage element temporarily stores transactions passing from said graphics bus interface to said CPU interface.

5. A computer system as in claim 4 wherein said CPU-to-memory queue, said memory-to-CPU queue, and said first and second queue storage elements concurrently store transactions passing between said CPU interface, said memory controller and said graphics bus interface.

6. A computer system as in claim 5 wherein said third queue storage element temporarily stores transactions passing from said graphics bus interface to said memory controller and said fourth queue storage element temporarily stores transactions passing from said memory controller to said graphics bus interface.

7. A computer system as in claim 6 wherein said CPU-to-memory queue, said memory-to-CPU queue, and said first, second, third, and fourth queue storage elements concurrently store transactions between said CPU interface, said memory controller, and said graphics bus interface.

8. A computer system as in claim 7 wherein said interface apparatus further includes a first bus interface coupled to a first expansion bus and said queue storage and control logic includes a fifth queue storage element and a sixth queue storage element coupling said first interface to said memory controller.

9. A computer system as in claim 8 wherein said first expansion bus comprises a PCI bus and said first interface comprises a PCI interface, and said graphics bus comprises an AGP bus and said graphics bus interface comprises an AGP interface.

10. A computer system as in claim 9 wherein said queue storage and control logic further includes a seventh queue storage element, said fifth and sixth queue storage elements couple said memory controller to said AGP interface and said seventh queue storage element couples said AGP interface to said PCI interface.

11. A computer system as in claim 10 wherein said CPU-to-memory queue, said memory-to-CPU queue and said first, second, third, fourth, fifth, sixth, and seventh queue storage elements concurrently store transactions passing between said CPU interface, said memory controller, said PCI interface and said AGP interface.

12. A computer system, comprising:
   a CPU;
   a memory device;
   a graphics bus;
   an interface apparatus coupling said CPU, said memory device, and said graphics bus, said interface apparatus including:
      a CPU interface;
      a memory controller;
      a graphics bus interface; and
      a queue storage and control logic unit coupling said CPU interface, said memory controller, and said graphics bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a third queue and a fourth queue coupling said memory controller to said graphics bus interface; and an input device operatively coupled to said interface apparatus.

13. A computer system as in claim 12 wherein said first queue temporarily stores CPU to graphics bus write requests.

14. A computer system as in claim 12 wherein said graphics bus interface normally posts memory write requests from said graphics bus interface to said third queue.

15. A method for concurrently processing bus cycle information in a computer system, comprising:

(a) providing at least one memory cycle request from a CPU bus to a memory device;

(b) providing at least one bus cycle request from a graphics bus to an expansion bus, wherein at least a portion of steps (a) and (b) occur concurrently.

16. A method as in claim 15 further including:

(c) providing at least one memory cycle request from an expansion bus to said memory device, wherein at least a portion of steps (a), (b), and (c) occur concurrently.

17. A method as in claim 16 wherein said memory cycle requests from said CPU and expansion buses comprise memory write cycles and including posting said write cycles to a plurality of write queues.

18. A method as in claim 17 further including posting said memory write cycle requests from said CPU bus to a CPU bus-to-memory write queue.

19. A computer system, comprising:

a CPU;

a memory device;

a graphics bus;

an expansion bus;

an interface apparatus coupling said CPU, said memory device, and said expansion bus, said interface apparatus including:

a CPU interface;

a memory controller;

a graphics bus interface; and a queue storage and control logic unit coupling said CPU interface, said memory controller, and said graphics bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a memory-to-graphics bus queue and a graphics bus-to-memory queue coupling said memory controller to said graphics bus interface; and an input device operatively coupled to said interface apparatus.

20. A computer system as in claim 19 wherein said expansion bus comprises a PCI bus and said interface apparatus further includes a PCI bus interface.

21. A computer system as in claim 20 wherein said first queue temporarily stores CPU-to-graphics bus write requests.

22. A computer system as in claim 20 wherein said graphics bus interface normally posts memory write requests from said graphics bus interface to said graphics bus-to-memory queue.

23. A computer system, comprising:

a CPU;

a memory device;

a graphics bus;

an interface apparatus coupling said CPU, said memory device, and said graphics bus, said interface apparatus including:

a CPU interface;

a memory controller;

a graphics bus interface; and a queue storage and control logic unit coupling said CPU interface, said memory controller, and said graphics bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a third queue and a fourth queue coupling said memory controller to said graphics bus interface;

wherein said first queue temporarily stores CPU to graphics bus write requests, and wherein said graphics bus interface normally provides read requests to said memory controller and said graphics bus interface ceases providing read requests to said memory controller if any CPU to graphics bus write requests are temporarily stored in said first queue; and an input device operatively coupled to said interface apparatus.

24. A computer system, comprising:

a CPU;

a memory device;

a graphics bus;

an interface apparatus coupling said CPU, said memory device, and said graphics bus, said interface apparatus including:

a CPU interface;

a memory controller;

a graphics bus interface; and a queue storage and control logic unit coupling said CPU interface, said memory controller, and said graphics bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a third queue and a fourth queue coupling said memory controller to said graphics bus interface;

wherein said graphics bus interface normally posts memory write requests from said graphics bus interface to said third queue, and wherein said graphics bus interface ceases posting memory write requests from said graphics bus interface to said third queue when a CPU to graphics bus read request is pending and pending graphics bus-to-memory write requests are posted in said in said third queue; and an input device operatively coupled to said interface apparatus.

25. A computer system as in claim 24 wherein said graphics bus interface ceases posting memory write requests by retrying graphics bus write requests.

26. A computer system, comprising:
a CPU;
a memory device;
a graphics bus;
an interface apparatus coupling said CPU, said memory device, and said graphics bus, said interface apparatus including:
a CPU interface;
a memory controller;
a graphics bus interface; and
a queue storage and control logic unit coupling said CPU interface, said memory controller, and said graphics bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a third queue and a fourth queue coupling said memory controller to said graphics bus interface;
wherein said CPU interface ceases posting said CPU to memory write requests to said CPU to memory queue when said third queue is full of posted graphics bus to memory write requests; and
an input device operatively coupled to said interface apparatus.

27. A computer system as in claim 26 wherein said CPU interface ceases posting said CPU-to-memory write requests to said CPU to memory queue until said third queue is not full and a no post counter expires.

28. A computer system as in claim 27 wherein said no post counter counts for a programmable period of time.

29. A computer system, comprising:
a CPU;
a memory device;
a graphics bus;
an interface apparatus coupling said CPU, said memory device, and said graphics bus, said interface apparatus including:
a CPU interface;
a memory controller;
a graphics bus interface; and
a queue storage and control logic unit coupling said CPU interface, said memory controller, and said graphics bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a third queue and a fourth queue coupling said memory controller to said graphics bus interface;
wherein said CPU interface ceases posting said CPU-to-memory write requests to said CPU-to-memory queue when said third queue contains graphics bus-to-memory write requests, a latency counter associated with an graphics bus to memory read request expires, and the graphics bus-to-memory read request has not received a read acknowledge signal from said graphics bus interface; and
an input device operatively coupled to said interface apparatus.

30. A computer system as in claim 29 wherein said CPU interface ceases posting said CPU-to-memory write requests to said CPU-to-memory queue until a graphics bus-to-memory read request is accepted for execution by said memory controller and a CPU-to-memory no post counter expires.

31. A computer system, comprising:
a CPU;
a memory device;
a graphics bus;
an interface apparatus coupling said CPU, said memory device, and said graphics bus, said interface apparatus including:
a CPU interface;
a memory controller;
a graphics bus interface; and
a queue storage and control logic unit coupling said CPU interface, said memory controller, and said graphics bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a third queue and a fourth queue coupling said memory controller to said graphics bus interface;
wherein said CPU interface ceases posting said CPU-to-memory write requests to said CPU-to-memory queue when said third queue contains an graphics bus-to-memory write request to a memory address and said graphics bus initiates a read request from memory to the same memory address; and
an input device operatively coupled to said interface apparatus.

32. A method for concurrently processing bus cycle information in a computer system, comprising:
providing at least one memory write cycle request from a CPU bus to a memory device; providing at least one memory write cycle request from a graphics bus to said memory device by posting said memory write cycle requests to a graphics bus-to-memory write queue;
providing at least one memory write cycle request from an expansion bus to said memory device, wherein at least a portion of the providing steps occur concurrently; and
ceasing posting said memory write cycle requests from said graphics bus to said graphics bus-to-memory write queue when a CPU is starved for memory access.

33. A method for concurrently processing bus cycle information in a computer system, comprising:
providing at least one memory write cycle request from a CPU bus to a memory device by posting said memory write request to a CPU bus-to-memory write queue;
providing at least one memory write cycle request from a graphics bus to said memory device;
providing at least one memory write cycle request from an expansion bus to said memory device, wherein at least a portion of the providing steps occur concurrently; and
ceasing posting said memory write cycle requests from said CPU bus to said CPU bus-to-memory write queue when said graphics bus is starved for memory access.

34. A computer system, comprising:
a CPU;
a memory device;
a graphics bus;
a PCI bus;
an interface apparatus coupling said CPU, said memory device, and said expansion bus, said interface apparatus including:

a CPU interface;
a memory controller;
a PCI bus interface; and
a queue storage and control logic unit coupling said CPU interface, said memory controller, and said PCI bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a memory-to-graphics bus queue and a graphics bus-to-memory queue coupling said memory controller to said graphics bus interface;
wherein said first queue temporarily stores CPU-to-graphics bus write requests, and wherein said graphics bus interface normally provides read requests to said memory controller and said graphics bus interface ceases providing read requests to said memory controller if any CPU to graphics bus write requests are temporarily stored in said first queue; and
an input device operatively coupled to said interface apparatus.

35. A computer system, comprising:
a CPU;
a memory device;
a graphics bus;
a PCI bus;
an interface apparatus coupling said CPU, said memory device, and said expansion bus, said interface apparatus including:
a CPU interface;
a memory controller;
a PCI bus interface; and
a queue storage and control logic unit coupling said CPU interface, said memory controller, and said PCI bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a memory-to-graphics bus queue and a graphics bus-to-memory queue coupling said memory controller to said graphics bus interface;
wherein said graphics bus interface normally posts memory write requests from said graphics bus interface to said graphics bus-to-memory queue, and wherein said graphics bus interface ceases posting memory write requests from said graphics bus interface to said graphics bus-to-memory queue when a CPU to graphics bus read request is pending and pending graphics bus to memory write requests are posted in said in said graphics bus-to-memory queue; and
an input device operatively coupled to said interface apparatus.

36. A computer system as in claim 35 wherein said graphics bus interface ceases posting memory write requests by retrying graphics bus write requests.

37. A computer system, comprising:
a CPU;
a memory device;
a graphics bus;
a PCI bus;
an interface apparatus coupling said CPU, said memory device, and said expansion bus, said interface apparatus including:

a CPU interface;
a memory controller;
a PCI bus interface; and
a queue storage and control logic unit coupling said CPU interface, said memory controller, and said PCI bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a memory-to-graphics bus queue and a graphics bus-to-memory queue coupling said memory controller to said graphics bus interface;
wherein said CPU interface ceases posting said CPU-to-memory write requests to said CPU-to-memory queue when said graphics bus-to-memory queue is full of posted graphics bus-to-memory write requests; and
an input device operatively coupled to said interface apparatus.

38. A computer system as in claim 37 wherein said CPU interface ceases posting said CPU-to-memory write requests to said CPU-to-memory queue until said graphics bus-to-memory queue is not full and a no post counter expires.

39. A computer system as in claim 38 wherein said no post counter for a programmable period of time.

40. A computer system, comprising:
a CPU;
a memory device;
a graphics bus;
a PCI bus;
an interface apparatus coupling said CPU, said memory device, and said expansion bus, said interface apparatus including:
a CPU interface;
a memory controller;
a PCI bus interface; and
a queue storage and control logic unit coupling said CPU interface, said memory controller, and said PCI bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a memory-to-graphics bus queue and a graphics bus-to-memory queue coupling said memory controller to said graphics bus interface;
wherein said CPU interface ceases posting said CPU-to-memory write requests to said CPU to memory queue when said graphics bus-to-memory queue contains a graphics bus-to-memory write request to a memory address and said graphics bus initiates a read request from memory to the same memory address; and
an input device operatively coupled to said interface apparatus.

41. A computer system, comprising:
a CPU;
a memory device;
a graphics bus;
an interface apparatus coupling said CPU, said memory device, and said graphics bus, said interface apparatus including:
a CPU interface;
a memory controller;

a graphics bus interface; and a queue storage and control logic unit coupling said CPU interface, said memory controller, and said graphics bus interface, said queue storage and control logic including a CPU-to-memory queue for posting CPU-to-memory write requests, a memory-to-CPU queue for temporarily storing read data, a first queue and a second queue coupling said CPU and said graphics bus interfaces, and a third queue and a fourth queue coupling said memory controller to said graphics bus interface;

wherein said CPU interface ceases posting said CPU-to-memory write requests to said CPU-to-memory queue when said CPU-to-memory queue contains CPU-to-memory write requests, a latency counter associated with an graphics bus-to-memory read request expires, and the graphics bus-to-memory read request has not received a read acknowledge signal from said graphics bus interface; and an input device operatively coupled to said interface apparatus.

* * * * *